(12) United States Patent  (10) Patent No.: US 8,897,569 B2
Zhang et al.  (45) Date of Patent: Nov. 25, 2014

(54) IMAGE ENLARGEMENT DEVICE, IMAGE ENLARGEMENT PROGRAM, MEMORY MEDIUM ON WHICH AN IMAGE ENLARGEMENT PROGRAM IS STORED, AND DISPLAY DEVICE

(75) Inventors: Xiaomang Zhang, Osaka (JP); Masafumi Ueno, Osaka (JP); Yasuhiro Ohki, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 169 days.

(21) Appl. No.: 13/582,361

(22) PCT Filed: Nov. 9, 2010

(86) PCT No.: PCT/JP2010/069893
§ 371 (c)(1),
(2), (4) Date: Aug. 31, 2012

(87) PCT Pub. No.: WO2011/108144
PCT Pub. Date: Sep. 9, 2011

(65) Prior Publication Data
US 2012/0321194 A1   Dec. 20, 2012

(30) Foreign Application Priority Data

Mar. 1, 2010 (JP) .................................. 2010-043897
May 14, 2010 (JP) .................................. 2010-111686

(51) Int. Cl.
G06K 9/40 (2006.01)
H04N 7/12 (2006.01)
(Continued)

(52) U.S. Cl.
CPC ............ H04N 1/3935 (2013.01); G06T 3/4084 (2013.01); G06T 5/003 (2013.01);
(Continued)

(58) Field of Classification Search
USPC ......... 382/190, 237, 233, 232, 239, 281, 240,
382/246, 274, 244, 275, 270, 234, 251, 163,
382/254, 278, 248, 235, 276, 132, 131, 271,
382/272, 273, 261, 262, 263, 264, 265;
375/240, 240.18, 240.19, E7.001,
375/E7.026, E7.226; 348/407, 424, 420,
348/398, 384
See application file for complete search history.

(56) References Cited

U.S. PATENT DOCUMENTS 5,598,481 A * 1/1997 Nishikawa et al. .......... 382/130
5,892,850 A * 4/1999 Tsuruoka ..................... 382/240
(Continued)

FOREIGN PATENT DOCUMENTS

EP   1 164 781   12/2001
JP   7-152907   6/1995
(Continued)

OTHER PUBLICATIONS

Search Report dated Dec. 14, 2010, directed to International Application No. PCT/JP2010/069893; 6 pages.
(Continued)

Primary Examiner — Sheela Chawan
(74) Attorney, Agent, or Firm — Morrison & Foerster LLP

(57) ABSTRACT

The disclosed image enlargement device is provided with: an image enlargement filter (1) that enlarges an input image, generating a first enlarged image; a first wavelet transformation unit (2) that performs a wavelet transformation on the first enlarged image; a second wavelet transformation unit (3) that performs a wavelet transformation on the first enlarged image; and an accentuation processing unit (6, 7, 8, 10) that performs an accentuation process using a first edge signal (EDGE_CDF9/7), generated from the output of the first wavelet transformation unit, and a second edge signal (EDGE_Harr), generated from the output of the second wavelet transformation unit. The first wavelet transformation unit and the second wavelet transformation unit perform different wavelet transformations.

10 Claims, 26 Drawing Sheets

(51) Int. Cl.
*H04N 1/393* (2006.01)
*G06T 3/40* (2006.01)
*G06T 5/00* (2006.01)
*G06T 5/10* (2006.01)

(52) U.S. Cl.
CPC ......... *G06T 5/10* (2013.01); *G06T 2207/20016* (2013.01); *G06T 2207/20064* (2013.01); *G06T 2207/20192* (2013.01)
USPC ....... 382/190; 382/263; 382/264; 375/240.19

(56) References Cited

U.S. PATENT DOCUMENTS

| | | | |
|---|---|---|---|
| 6,236,765 | B1 | 5/2001 | Acharya |
| 6,785,411 | B1 * | 8/2004 | Kitajima et al. ............... 382/133 |
| 6,975,753 | B2 * | 12/2005 | Matsuura et al. ............. 382/132 |
| 7,072,524 | B1 | 7/2006 | Yamada |
| 7,336,811 | B2 * | 2/2008 | Takeo ........................... 382/132 |
| 8,249,370 | B2 * | 8/2012 | Kanamori et al. ............. 382/232 |
| 8,463,061 | B2 * | 6/2013 | Takada .......................... 382/240 |
| 2004/0042679 | A1 | 3/2004 | Yamada |
| 2004/0091166 | A1 | 5/2004 | Yamada |

FOREIGN PATENT DOCUMENTS

| | | |
|---|---|---|
| JP | 2000-215305 | 8/2000 |
| JP | 2000-293684 | 10/2000 |
| JP | 2001-8027 | 1/2001 |
| JP | 2002-522831 | 7/2002 |
| JP | 2004-214985 | 7/2004 |
| JP | 2004-260682 | 9/2004 |
| JP | 2005-11191 | 1/2005 |
| JP | 2009-76030 | 4/2009 |

OTHER PUBLICATIONS

Kanumuri et al. "Fast Super-Resolution Reconstructions of Mobile Video Using Warped Transforms and Adaptive Thresholding," 13 pages.

Guleryuz (Jan. 9, 2004) "Predicting Wavelet Coefficients Over Edges Using Estimates Based on Nonlinear Approximants," 10 pages.

Boon et al., "Sparse Super-Resolution Reconstructions of Video from Mobile Devices in Digital TV Broadcast Applications," 12 pages.

* cited by examiner

M × N

2M × 2N

2M × 2N

2M × 2N

EACH M × N

EACH M × N

M × N

2K × 2L

2K × 2L

EACH K × L

EACH K × L (a)

(b)

RELATED ART

RELATED ART

Fig. 20

(a) EXAMPLE OF A FILTER FOR DETECTING AN EDGE IN A VERTICAL DIRECTION

| -1 | 0 | 1 |
|---|---|---|
| -2 | 0 | 2 |
| -1 | 0 | 1 |

(b) EXAMPLE OF A FILTER FOR DETECTING AN EDGE IN A HORIZONTAL DIRECTION

| -1 | -2 | -1 |
|---|---|---|
| 0 | 0 | 0 |
| 1 | 2 | 1 |

(c) EXAMPLE OF A FILTER FOR DETECTING AN EDGE IN AN OBLIQUE DIRECTION

| -2 | -1 | 0 |
|---|---|---|
| -1 | 0 | 1 |
| 0 | 1 | 2 |

RELATED ART

IMAGE ENLARGEMENT DEVICE, IMAGE ENLARGEMENT PROGRAM, MEMORY MEDIUM ON WHICH AN IMAGE ENLARGEMENT PROGRAM IS STORED, AND DISPLAY DEVICE

REFERENCE TO RELATED APPLICATIONS

This application is a national stage application under 35 USC 371 of International Application No. PCT/JP2010/069893, filed Nov. 9, 2010, which claims priority from Japanese Patent Application Nos. 2010-043897, filed Mar. 1, 2010, and 2010-111686, filed May 14, 2010, the entire contents of which are incorporated herein by reference.

FIELD OF THE INVENTION

The present invention relates to a technology that enlarges an image.

BACKGROUND OF THE INVENTION

In recent years, a full HD (1920 pixels×1080 pixels) television is becoming general, besides, a display panel having a high resolution such as 4k2k (4096 pixels×2048 pixels), 8k4k (8192 pixels×4096 pixels) and the like is also developed. On the other hand, SD (720 pixels×480 pixels under NTSC, 720 pixels×576 pixels under PAL) contents are present in large quantities. Accordingly, an image enlargement technology for displaying low resolution contents on a high resolution display device is necessary.

Conventionally, various image enlargement methods are proposed, in which there is a method that uses wavelet transform.

Here, an overview of the wavelet transform is described. FIG. 17 is a view that schematically shows an original image and a wavelet transform image. When discrete wavelet transform (DWT) is applied to an original image IMG, a wavelet transform image is obtained, which is composed of sub-band components IMG_LL, IMG_HL, IMG_LH, and IMG_HH. The image size of each sub-band component is ¼ of the original IMG.

A low pass filter process and a sampling process for obtaining the ½ size are applied to the original image IMG in a horizontal direction, then, to whose result the low pass filter process and the sampling process for obtaining the ½ size are applied in a vertical direction, whose result is the sub-band component IMG_LL. Here, the sub-band component IMG_LL may be a result that is obtained by applying the low pass filter process and the sampling process for obtaining the ½ size to the original image IMG in the vertical direction, then, applying to whose result the low pass filter process and the sampling process for obtaining the ½ size in the horizontal direction.

A high pass filter process and the sampling process for obtaining the ½ size are applied to the original image IMG in the horizontal direction, then, to whose result the low pass filter process and the sampling process for obtaining the ½ size are applied in the vertical direction, whose result is the sub-band component IMG_HL. Accordingly, the sub-band component IMG_HL represents an image in which a high-frequency component in the horizontal direction of the original image IMG is extracted, that is, an image that reflects edge information that faces in the vertical direction. Here, the sub-band component IMG_HL may be a result that is obtained by applying the low pass filter process and the sampling process for obtaining the ½ size to the original image IMG in the vertical direction, then, applying to whose result the high pass filter process and the sampling process for obtaining the ½ size in the horizontal direction.

The low pass filter process and the sampling process for obtaining the ½ size are applied to the original image IMG in the horizontal direction, then, to whose result the high pass filter process and the sampling process for obtaining the ½ size are applied in the vertical direction, whose result is the sub-band component IMG_LH. Accordingly, the sub-band component IMG_LH represents an image in which a high-frequency component in the vertical direction of the original image IMG is extracted, that is, an image that reflects edge information that faces in the horizontal direction. Here, the sub-band component IMG_LH may be a result that is obtained by applying the high pass filter process and the sampling process for obtaining the ½ size to the original image IMG in the vertical direction, then, applying to whose result the low pass filter process and the sampling process for obtaining the ½ size in the horizontal direction.

The high pass filter process and the sampling process for obtaining the ½ size are applied to the original image IMG in the horizontal direction, then, to whose result the high pass filter process and the sampling process for obtaining the ½ size are applied in the vertical direction, whose result is the sub-band component IMG_HH. Accordingly, the sub-band component IMG_HH represents an image (an image in which a high frequency component in an oblique direction of the original image IMG is extracted) in which a high-frequency component in the horizontal direction and a high frequency component in the vertical direction of the original image IMG are extracted, that is, an image that reflects edge information that faces in the oblique direction. Here, the sub-band component IMG_HH may be a result that is obtained by applying the high pass filter process and the sampling process for obtaining the ½ size to the original image IMG in the vertical direction, then, applying to whose result the high pass filter process and the sampling process for obtaining the ½ size in the horizontal direction.

By applying inverse discrete wavelet transform (IDWT) to the wavelet transform image that is composed of the sub-band components IMG_LL, IMG_HL, IMG_LH, and IMG_HH, the original image IMG is obtained.

Next, an overview of an image enlargement method using the wavelet transform is described. FIG. 18 is a view that schematically shows the overview of the image enlargement method that uses the wavelet transform.

An input image IMG_IN which is an enlargement target image is regarded as the sub-band component IMG_LL of a wavelet transform image. There is no information about the remaining three sub-band components (sub-band components in which a high frequency component is contained) IMG_HL, IMG_LH, and IMG_HH, accordingly, sub-band components IMG_HL (0), IMG_LH (0) and IMG_HH (0), all pixel values of which are 0, are used. According to this, the input image IMG_IN is regardable as a wavelet transform image that is composed of the sub-band components IMG_IN, IMG_HL (0), IMG_LH (0) and IMG_HH (0).

By applying the inverse discrete wavelet transform to the wavelet transform image that is composed of the sub-band components IMG_IN, IMG_HL (0), IMG_LH (0) and IMG_HH (0), an output image IMG_OUT is obtained, which is an enlarged image and has the number of pixels that is 4 times the input image IMG_IN. However, the wavelet transform image composed of the sub-band components IMG_IN, IMG_HL (0), IMG_LH (0) and IMG_HH (0) does not have information about a high frequency component, accordingly, the output image IMG_OUT which is the enlarged image is prone to become blurred.

To the contrary, if there is suitable information about the three sub-band components (sub-band components in which the high frequency component is contained) IMG_HL, IMG_LH, and IMG_HH, it is possible to solve the problem that the enlarged image is prone to become blurred. Besides, by performing gain adjustment of the sub-band component IMG_HL and thereafter performing the inverse discrete wavelet transform, it is possible to obtain an enlarged image in which an edge facing in the vertical direction is accentuated; by performing gain adjustment of the sub-band component IMG_LH and thereafter performing the inverse discrete wavelet transform, it is possible to obtain an enlarged image in which an edge facing in the horizontal direction is accentuated; and by performing gain adjustment of the sub-band component IMG_HH and thereafter performing the inverse discrete wavelet transform, it is possible to obtain an enlarged image in which an edge facing in the oblique horizontal direction is accentuated.

Methods for obtaining the information about the three sub-band components (sub-band components in which the high frequency component is contained) IMG_HL, IMG_LH, and IMG_HH are proposed by a patent literature 1, a patent literature 2, and non-patent literatures 1-3.

The image enlargement method proposed by the patent literature 1 is described with reference to FIG. 19. First, by applying the discrete wavelet transform to the input image IMG_IN that is an enlargement target, a wavelet transform image is obtained, which is composed of sub-band components LL2, HL2, LH2, and HH2. Then, by using information about the sub-band components LL2, HL2, LH2, and HH2, the three sub-band components (sub-band components in which the high frequency component is contained) IMG_HL, IMG_HH, and IMG_HH are predicted. Here, a coefficient used for the prediction is obtained from learning. And, the input image IMG_IN, which is the enlargement target, is regarded as the sub-band component IMG_LL of the wavelet transform image; a combination of the sub-band component IMG_LL and the predicted three sub-band components (sub-band components in which the high frequency component is contained) IMG_HL, IMG_LH, and IMG_HH is regarded as the wavelet transform image, and the inverse discrete wavelet transform is performed, whereby the output image IMG_OUT which is an enlarged image is obtained. Here, also the image enlargement method proposed by the patent literature 3, like the image enlargement method proposed by the patent literature 1, predicts the three sub-band components (sub-band components in which the high frequency component is contained) IMG_HL, IMG_LH, and IMG_HH.

Next, the image enlargement method proposed by the patent literature 2 is described with reference to FIG. 20. An enlargement target image is regarded as the sub-band component IMG_LL of a wavelet transform image. Then, by using a filter shown in FIG. 20 (*a*), an edge component in a vertical direction of the enlargement target image is extracted and is regarded as the sub-band component IMG_HL that is deficient; by using a filter shown in FIG. 20 (*b*), an edge component in a horizontal direction of the enlargement target image is extracted and regarded as the sub-band component IMG_LH that is deficient; by using a filter shown in FIG. 20 (*c*), an edge component in an oblique direction of the enlargement target image is extracted and regarded as the sub-band component IMG_HH that is deficient; a combination of the above four is regarded as the wavelet transform image, and the inverse discrete wavelet transform is performed, whereby an enlarged image is obtained.

Next, the image enlargement method proposed by the non-patent literature 2 is described. The non-patent literature 1 describes a method for predicting the three sub-band components (sub-band components in which a high frequency component is contained) by assuming Sparsity constraint, repeatedly performing calculations until convergence and predicting an edge; the non-patent literature 2 applies this method to the image enlargement. The non-patent literature 3 improves the method described in the non-patent literature 1, reduces the number of convergences to 2 and performs the image enlargement.

According to the image enlargement method proposed by the patent literature 1, there is no guarantee of correctly predicting a sub-band component which contains a high frequency component of an image that is not taught. Besides, according to the image enlargement method proposed by the patent literature 1, it is impossible to perform the image enlargement and sufficient edge accentuation at the same time. Because of this, there is a risk that the enlarged image is blurred and becomes unclear. Here, the image enlargement method proposed by the patent literature 3 has the same problem as the image enlargement method proposed by the patent literature 1, further has also a problem that a large quantity of calculations are required.

According to the image enlargement method proposed by the patent literature 2, determining from an exemplified edge detection filter (see FIG. 20), it is impossible to obtain suitable information about a sub-band component in which a high frequency component is contained. Even in a case where the exemplified edge detection filter is used as it is to perform edge accentuation, an overshoot and Jaggy occur, further, when the inverse discrete wavelet transform is performed, the image size is enlarged by two times in both of the horizontal direction and the vertical direction, accordingly, the Jaggy spreads. Accordingly, in the enlarged image obtained by the image enlargement method proposed by the patent literature 2, unnatural Jaggy occurs in the accentuated edge.

The image enlargement methods proposed by the non-patent literature 2 and the non-patent literature 3 have a problem that it is impossible to accentuate a weak edge which is equal to or smaller than a threshold value under a sparsity constraint condition. Besides, according to the image enlargement methods proposed by the non-patent literature 2 and the non-patent literature 3, in the prediction of edge information, it is necessary to repeatedly perform a plurality of calculations until convergence, accordingly, there is also a problem that the amount of calculations is large and a delay occurs.

An image enlargement device which is able to solve the above problems is invented by the inventor of the present application and is already filed by the inventor as a patent application (Japanese patent application No. 2009-225995). FIG. 21 shows an example of the image enlargement device proposed by the Japanese patent application No. 2009-225995.

The image enlargement device shown in FIG. 21 includes: a Lanczos3 filter 101; a discrete wavelet transform portion 102; multipliers 103 to 105; an inverse discrete wavelet transform portion 106; and a control portion (not shown) that incorporates a rewritable non-volatile memory.

The control portion reads, from the non-volatile memory, constant settings for the Lanczos3 filter 101, the discrete wavelet transform portion 102, and the inverse discrete wavelet transform portion 106, and sets constants into the Lanczos3 filter 101, the discrete wavelet transform portion 102, and the inverse discrete wavelet transform portion 106.

The Lanczos3 filter 101 generates an enlarged image IMG_UP that is obtained by enlarging the input image IMG_IN in both of the horizontal direction and the vertical direction.

The discreet wavelet transform portion 102 applies the discrete wavelet transform to the enlarged image IMG_UP, thereby generating the sub-band components IMG_LL, IMG_HL, IMG_LH, and IMG_HH.

Besides, the control portion reads, from the non-volatile memory, a gain value G_HL that corresponds to accentuation strength of an edge which faces in the vertical direction; a gain value G_LH that corresponds to accentuation strength of an edge which faces in the horizontal direction; and a gain value G_HH that corresponds to accentuation strength of an edge which faces in the oblique direction; supplies the gain value G_HL to the multiplier 103; the gain value G_LH to the multiplier 104; and the gain value G_HH to the multiplier 105. The multiplier 103 supplies a product, which is obtained by multiplying the sub-band component IMG_HL and the gain value G_HL, to the inverse discrete wavelet transform portion 106. The multiplier 104 supplies a product, which is obtained by multiplying the sub-band component IMG_LH and the gain value G_LH, to the inverse discrete wavelet transform portion 106. The multiplier 105 supplies a product, which is obtained by multiplying the sub-band component IMG_HH and the gain value G_HH, to the inverse discrete wavelet transform portion 106. Here, the sub-band component IMG_LL is supplied as it is to the discrete wavelet transform portion 106.

The inverse discrete wavelet transform portion 106 regards the sub-band component IMG_LL as the sub-band component IMG_LL of an wavelet transform image and regards a combination of the sub-band component IMG_LL and the three sub-band components IMG_HL•G_HL, IMG_LH•G_LH, and IMG_HH•G_HH after the gain process as a wavelet transform image, and performs the inverse discrete wavelet transform, thereby generating an enlarged image IMG_SYNTH. The enlarged image IMG_SYNTH becomes an output from the image enlargement device shown in FIG. 21.

During the image enlargement process by the Lanczos3 filter 101, it is possible to boost a weak high frequency component (somewhat attenuated high frequency component), however, it is impossible to adjust the strength of the weak high frequency component. Nevertheless, according to the image enlargement device shown in FIG. 21, it is possible to adjust the edge accentuation strength by applying the gain process to the sub-band components IMG_HL, IMG_HH, and IMG_HH, accordingly, it is possible to obtain an image that has less Jaggy and a high quality.

PLT1: JP-A-2000-215305 (paragraph [0035], FIG. 5)
PLT2: JP-A-2001-8027 (paragraph [0041], FIG. 1, FIG. 6)
PLT3: JP-A-1995-152907 (abstract)
NPLT1: G. Guleryuz, "Predicting wavelet coefficients over Edges using estimates based on nonlinear approximants," Proc. data compression conference, IEEE DCC-04, 2004.
NPLT2: C. S. Boon, O. G. Guleryuz, T. Kawahara, and Y. Suzuki, "Sparse super-resolution reconstructions of video from mobile devices in digital TV broadcast applications," Proc. SPIE conference on applications on of digital image processing XXIX, San Diego, 2006.
NPLT3: S. Kanumuri, O. G. Guleryuz and M. R. Givanlar. "Fast super-resolution reconstructions of mobile video using warped transforms and adaptive thresholding," Proc. SPIE conference on applications of digital image processing XXX, 2007.

SUMMARY OF THE INVENTION

However, the image enlargement device shown in FIG. 21 and the image enlargement device proposed by the Japanese patent application No. 2009-225995 use only one kind of wavelet transform, accordingly, have a problem that it is impossible to accentuate an image contour (sharp edge, structure) and an image detail (gradual edge, texture) at the same time with a good image quality.

For example, in a case where only CDF9/7 wavelet transform is used, the contour of a natural image is detectable, but the image detail is undetectable. Besides, for example, in a case where only Haar wavelet transform is used, the image contour and the image detail are detectable at the same time, but the detected image contour is conspicuous in Jaggy compared with the case where only the CDF9/7 wavelet transform is used.

In light of the above situation, it is an object of the present invention to provide: an image enlargement device, an image enlargement program, a memory medium that stores the image enlargement program, and a display device that are able to accentuate an image contour and an image detail at the same time with a good image quality.

To achieve the above object, an image enlargement device according to the present invention has a structure (first structure) that includes: an image enlargement filter that generates a first enlarged image of an input image; a first wavelet transform portion that generates, by applying wavelet transform to the first enlarged image, a first sub-band component indicating an image obtained by extracting a low frequency component in a horizontal direction of the first enlarged image and a low frequency component in a vertical direction of the first enlarged image; a second sub-band component indicating an image obtained by extracting a high frequency component in a horizontal direction of the first enlarged image; a third sub-band component indicating an image obtained by extracting a high frequency component in a vertical direction of the first enlarged image; and a fourth sub-band component indicating an image obtained by extracting a high frequency component in a horizontal direction of the first enlarged image and a high frequency component in a vertical direction of the first enlarged image; a second wavelet transform portion that generates, by applying the wavelet transform to the first enlarged image, a fifth sub-band component indicating an image obtained by extracting a low frequency component in a horizontal direction of the first enlarged image and a low frequency component in a vertical direction of the first enlarged image; a sixth sub-band component indicating an image obtained by extracting a high frequency component in a horizontal direction of the first enlarged image; a seventh sub-band component indicating an image obtained by extracting a high frequency component in a vertical direction of the first enlarged image; and an eighth sub-band component indicating an image obtained by extracting a high frequency component in a horizontal direction of the first enlarged image and a high frequency component in a vertical direction of the first enlarged image; a first inverse wavelet transform portion that regards a predetermined sub-band component and the second sub-band component, the third sub-band component, and the fourth sub-band component, which are output from the first wavelet transform portion, as a wavelet transform image; performs inverse wavelet transform, thereby generating a first edge signal; a second inverse wavelet transform portion that regards the predetermined sub-band component and the sixth sub-band component, the seventh sub-band component, and the eighth sub-band component, which are output from the second wavelet transform portion, as the wavelet transform image; performs the inverse wavelet transform, thereby generating a second edge signal; an image enlargement portion that generates a second enlarged image; and an accentuation process portion that applies an accentuation process to the second enlarged image by using the first edge signal and the second edge signal; wherein the first wavelet transform portion and the second wavelet transform portion use wavelet transforms different from each other; and the first inverse wavelet transform portion and the second inverse wavelet transform portion use inverse wavelet transforms different from each other.

Besides, in the image enlargement device having the above first structure, a structure (second structure) may be employed, in which the first wavelet transform portion uses CDF9/7 wavelet transform; the second wavelet transform portion uses Haar wavelet transform; the first inverse wavelet transform portion uses CDF9/7 inverse wavelet transform; and the second inverse wavelet transform portion uses Haar inverse wavelet transform.

Besides, in the image enlargement device having the above first structure or second structure, a structure (third structure) may be employed, in which the image enlargement portion is a third inverse wavelet transform portion that regards the input image and three predetermined sub-band components as the wavelet transform image; performs the inverse wavelet transform, thereby generating the second enlarged image.

Besides, in the image enlargement device having the above first structure or second structure, a structure (fourth structure) may be employed, in which the image enlargement portion is a third inverse wavelet transform portion that regards the first sub-band component and three predetermined sub-band components as the wavelet transform image; performs the inverse wavelet transform, thereby generating the second enlarged image.

Besides, in the image enlargement device having the above first structure or second structure, a structure (fifth structure) may be employed, in which the image enlargement filter doubles as the image enlargement portion, and the first enlarged image and the second enlarged image are identical to each other.

Besides, when the image contour and the image detail are accentuated independent of each other, from the viewpoint of alleviating the contour remaining in the detail, in the image enlargement device having any one of the above first to fifth structures, a structure (sixth structure) may be employed, in which the first edge signal is a signal that represents an image contour; the second edge signal is a signal that contains both of the image contour and an image detail; if there is a pixel, in a region around a pixel of interest, in which the first edge signal is larger than a predetermined threshold value, the accentuation process portion sets a gain, which corresponds to the second edge signal of the pixel of interest, at zero.

Besides, from the viewpoint of alleviating mesh-like noise appearing on the contour and the detail, in the image enlargement device having any one of the above first to sixth structures, a structure (seventh structure) may be employed, in which a first low pass filter for applying a low pass filter process to the first edge signal is disposed between the first inverse wavelet transform portion and the accentuation process portion; and a second low pass filter for applying the low pass filter process to the second edge signal is disposed between the second inverse wavelet transform portion and the accentuation process portion.

To achieve the above object, an image enlargement program that makes a computer function as an image enlargement device which includes: an image enlargement filter that generates a first enlarged image of an input image; a first wavelet transform portion that generates, by applying wavelet transform to the first enlarged image, a first sub-band component indicating an image obtained by extracting a low frequency component in a horizontal direction of the first enlarged image and a low frequency component in a vertical direction of the first enlarged image; a second sub-band component indicating an image obtained by extracting a high frequency component in a horizontal direction of the first enlarged image; a third sub-band component indicating an image obtained by extracting a high frequency component in a vertical direction of the first enlarged image; and a fourth sub-band component indicating an image obtained by extracting a high frequency component in a horizontal direction of the first enlarged image and a high frequency component in a vertical direction of the first enlarged image; a second wavelet transform portion that generates, by applying the wavelet transform to the first enlarged image, a fifth sub-band component indicating an image obtained by extracting a low frequency component in a horizontal direction of the first enlarged image and a low frequency component in a vertical direction of the first enlarged image; a sixth sub-band component indicating an image obtained by extracting a high frequency component in a horizontal direction of the first enlarged image; a seventh sub-band component indicating an image obtained by extracting a high frequency component in a vertical direction of the first enlarged image; and an eighth sub-band component indicating an image obtained by extracting a high frequency component in a horizontal direction of the first enlarged image and a high frequency component in a vertical direction of the first enlarged image; a first inverse wavelet transform portion that regards a predetermined sub-band component and the second sub-band component, the third sub-band component, and the fourth sub-band component, which are output from the first wavelet transform portion, as a wavelet transform image; performs inverse wavelet transform, thereby generating a first edge signal; a second inverse wavelet transform portion that regards the predetermined sub-band component and the sixth sub-band component, the seventh sub-band component, and the eighth sub-band component, which are output from the second wavelet transform portion, as the wavelet transform image; performs the inverse wavelet transform, thereby generating a second edge signal; an image enlargement portion that generates a second enlarged image; and an accentuation process portion that applies an accentuation process to the second enlarged image by using the first edge signal and the second edge signal; wherein the first wavelet transform portion and the second wavelet transform portion use wavelet transforms different from each other; and the first inverse wavelet transform portion and the second inverse wavelet transform portion use inverse wavelet transforms different from each other.

To achieve the above object, a recording medium according to the present invention is a computer-readable memory medium that stores the image enlargement program.

To achieve the above object, a display device according to the present invention includes the image enlargement device that has any one of the first to seventh structures.

Besides, in the display device having the above structure, the input image for the image enlargement device may be a brightness image. Or, in the display device having the above structure, the image enlargement devices to the number of three may be disposed; the input image for a first one of the three image enlargement devices may be a red color component image; the input image for a second one of the three image enlargement devices may be a green color component image; and the input image for a third one of the three image enlargement devices may be a blue color component image.

According to the present invention, the first wavelet transform portion and the second wavelet transform portion use wavelet transforms different from each other, accordingly, it is possible to accentuate an image contour and an image detail at the same time with a good image quality.

BRIEF DESCRIPTION OF THE DRAWINGS

FIG. 20 is a view showing a filter example used in an image enlargement method that is proposed by a patent literature 2.

DETAILED DESCRIPTION OF THE INVENTION

Embodiments of the present invention are described hereinafter with reference to the drawings.

<Image Enlargement Device According to First Embodiment of the Present Invention>

Figure 1:
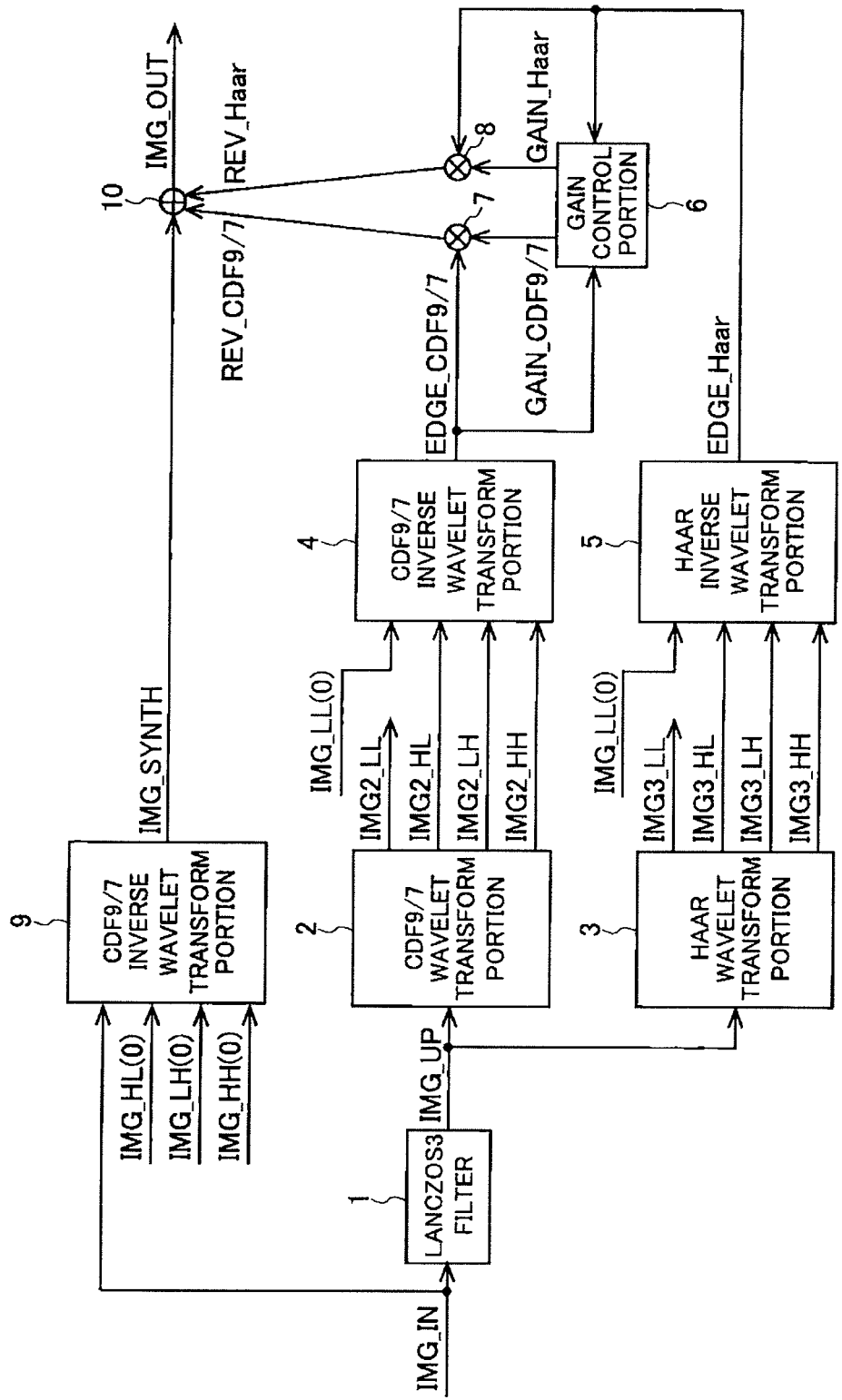
FIG. 1 is a view showing a structure of an image enlargement device according to a first embodiment of the present invention.

FIG. 1 shows a structure of an image enlargement device according to a first embodiment of the present invention. The image enlargement device according to the first embodiment of the present invention includes: a Lanczos3 filer 1; a CDF9/7 wavelet transform portion 2; a Haar wavelet transform portion 3; a CDF9/7 inverse wavelet transform portion 4; a Haar inverse wavelet transform portion 5; a gain control portion 6; multipliers 7 and 8; a CDF9/7 inverse wavelet transform portion 9; an adder 10; and a control portion (not shown) that incorporates a rewritable non-volatile memory.

Operation of the image enlargement device according to the first embodiment of the present invention is described with reference to a flow chart shown in FIG. 2.

First, the control portion reads, from the non-volatile memory, constant settings for the Lanczos3 filter 1, the CDF9/7 wavelet transform portion 2, the Haar wavelet transform portion 3, the CDF9/7 inverse wavelet transform portion 4, the Haar inverse wavelet transform portion 5, and the CDF9/7 inverse wavelet transform portion 9, and sets constants into the Lanczos3 filter 1, the CDF9/7 wavelet transform portion 2, the Haar wavelet transform portion 3, the CDF9/7 inverse wavelet transform portion 4, the Haar inverse wavelet transform portion 5, and the CDF9/7 inverse wavelet transform portion 9 (step S10). In the present embodiment, the constant for the Lanczos3 filter 1 is set such that the Lanczos3 filter 1 functions as an image enlargement filter that enlarges an image by two times in both of a horizontal direction and a vertical direction.

Next, the Lanczos3 filter 1 generates the enlarged image IMG_UP that is two times as large as the input image IMG_IN in both of the horizontal direction and the vertical direction (step S20). Besides, the CDF9/7 inverse wavelet transform portion 9 regards the input image IMG_IN as the sub-band component IMG_LL of an wavelet transform image, regards a combination of the sub-band component IMG_LL with the remaining three sub-band components IMG_HL (0), IMG_LH (0), and IMG_HH (0) as the wavelet transform image, and performs the CDF9/7 inverse wavelet transform, thereby generating the enlarged image IMG_SYNTH (step S20). Here, the sub-band components IMG_HL (0), IMG_LH (0), and IMG_HH (0) are sub-band components whose respective pixel values are all 0.

Next, the CDF9/7 wavelet transform portion 2 applies the CDF9/7 wavelet transform to the enlarged image IMG_UP to generate sub-band components IMG2_LL, IMG2_HL, IMG2_LH, and IMG2_HH (step S30). Besides, the Haar wavelet transform portion 3 applies the Haar wavelet transform to the enlarged image IMG_UP to generate sub-band components IMG3_LL, IMG3_HL, IMG3_LH, and IMG3_HH (step S30).

In the next step S40, a gain process is performed. Hereinafter, the gain process is described in detail.

The CDF9/7 inverse wavelet transform portion 4 regards a combination of the sub-band component IMG_LL (0) with the sub-band components IMG2_HL, IMG2_LH, and IMG2_HH output from the CDF9/7 wavelet transform portion 2 as the wavelet transform image, performs the CDF9/7 inverse wavelet transform to generate an edge signal EDGE_CDF9/7, and supplies the edge signal EDGE_CDF9/7 to the multiplier 7 and the gain control portion 6. Besides, the Haar inverse wavelet transform portion 5 regards a combination of the sub-band component IMG_LL (0) with the sub-band components IMG3_HL, IMG3_LH, and IMG3_HH output from the Haar wavelet transform portion 3 as the wavelet transform image, performs the Haar inverse wavelet transform to generate an edge signal EDGE_Haar, and supplies the edge signal EDGE_Haar to the multiplier 8 and the gain control portion 6. Here, the sub-band component IMG_LL (0) is a sub-band component whose pixel values are all 0.

The gain control portion 6, based on the edge signals EDGE_CDF9/7 and EDGE_Haar, decides respective values of the gains GAIN_CDF9/7 and GAIN_Haar.

In the present embodiment, the gain control portion 6 determines for every pixel whether the edge signal EDGE_CDF9/7 is larger than a first threshold value Th1 or not, sets the gain value at c1 (positive constant) for a pixel in which the edge signal EDGE_CDF9/7 is larger than the first threshold value Th1, and sets the gain value at 0 for a pixel in which the edge signal EDGE_CDF9/7 is equal to or smaller than the first threshold value Th1, thereby generating a gain GAIN_CDF9/7. And, the gain GAIN_CDF9/7 and the edge signal EDGE_CDF9/7 are multiplied together by the multiplier 7, whereby a correction signal REV_CDF9/7 is generated.

The edge signal EDGE_CDF9/7 obtained by using the CDF9/7 wavelet transform represents smoothly (naturally) the image contour, accordingly, thanks to the above process, the correction signal REV_CDF9/7 becomes a correction signal that accentuates the image contour portion. Here, the first threshold value Th1 is a coring threshold value.

Besides, in the present embodiment, the gain control portion 6 determines for every pixel whether the edge signal EDGE_CDF9/7 is smaller than a second threshold value Th2 or not and the edge signal EDGE_Haar is larger than a third threshold value Th3 or not, sets the gain value at c2 (positive constant) for a pixel in which the edge signal EDGE_CDF9/7 is smaller than the second threshold value Th2 and the edge signal EDGE_Haar is larger than the third threshold value Th3, and sets the gain value at 0 for a pixel in which the edge signal EDGE_CDF9/7 is equal to or larger than the second threshold value Th2 and/or the edge signal EDGE_Haar is equal to or smaller than the third threshold value Th3, thereby generating a gain GAIN_Haar. And, the gain GAIN_Haar and the edge signal EDGE_Haar are multiplied together by the multiplier 8, whereby a correction signal REV_Haar is generated. Here, the c2 may have the same value as the c1 or a value different from the c1.

The edge signal EDGE_Haar obtained by using the Haar wavelet transform contains both of the image contour and the image detail and Jaggy resides in the image contour contained in the edge signal EDGE_Haar, accordingly, the image contour portion (a pixel portion where the edge signal EDGE_VDF9/7 is large) is removed, and only the image detail portion is kept. Thanks to the above process, the correction signal REV_Haar becomes a correction signal that accentuates the image detail portion only. Here, the second threshold value Th2 is a threshold value for determining whether a pixel corresponds to the image contour portion or not, and the third threshold value Th3 is a coring threshold value.

Figure 3:
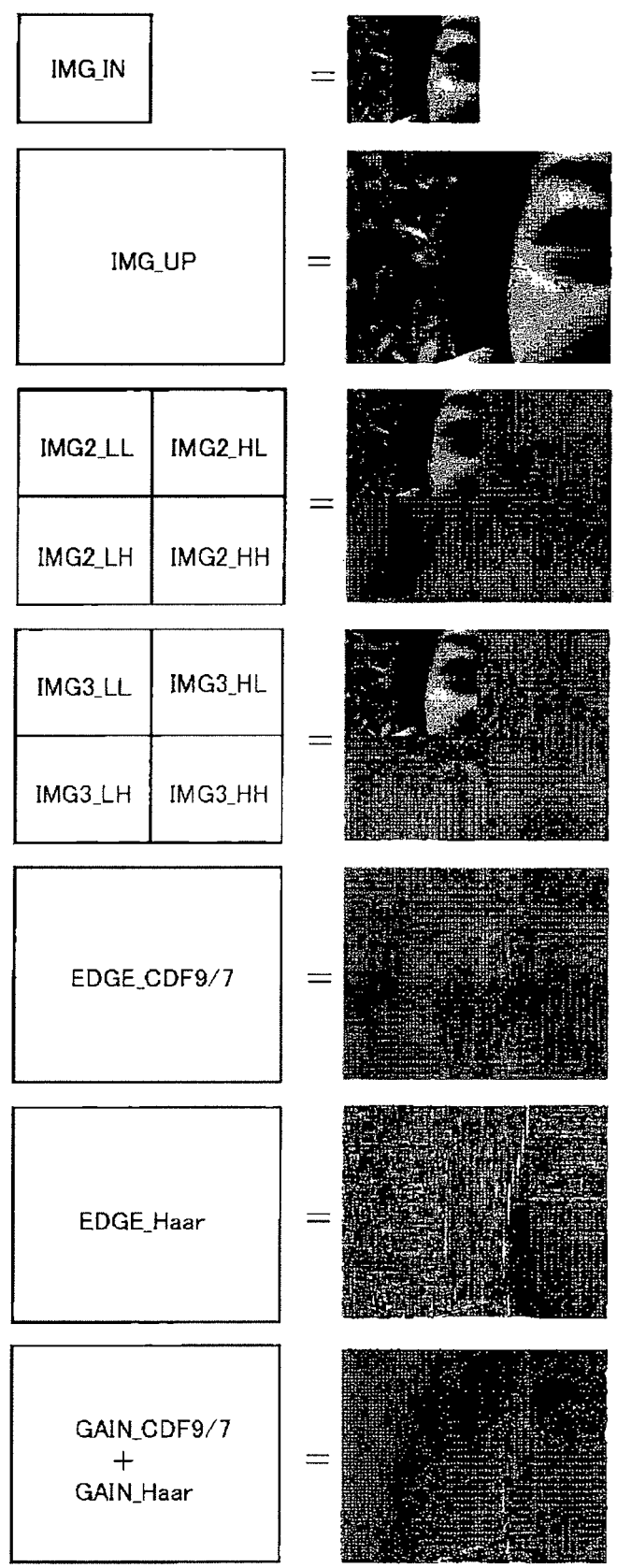
FIG. 3 is a view showing input and output data examples at each portion of the image enlargement device according to the first embodiment of the present invention.

Here, in a case where the first threshold value Th1 and the second threshold value Th2 are identical to each other, FIG. 3 shows input and output data examples at each portion of the image enlargement device according to the first embodiment of the present invention. In order from top, there visualized are: the input image IMG_IN input into the Lanczos3 filter 1; the enlarged image IMG_UP output from the Lanczos3 filter 1; the sub-band components IMG2_LL, IMG2_HL, IMG2_LH, and IMG2_HH output from the CDF9/7 wavelet transform portion 2; the sub-band components IMG3_LL, IMG3_HL, IMG3_LH, and IMG3_HH output from the Haar wavelet transform portion 3; the edge signal EDGE_CDF9/7 output from the CDF9/7 inverse wavelet transform portion 4; the edge signal EDGE_Haar output from the Haar inverse wavelet transform portion 5; the gains GAIN_CDF9/7 and GAIN_Haar output from the gain control portion 6. Here, in the visualized gains GAIN_CDF9/7 and GAIN_Haar shown at the lowest portion output from the gain control portion 6, a white portion is a portion where the "gain GAIN_CDF9/7=c1", a black portion is a portion where the "gain GAIN_Haar=c2", and a grey portion is a portion where the "gain GAIN_CDF9/7=0 and the gain GAIN_Haar=0."

Figure 2:
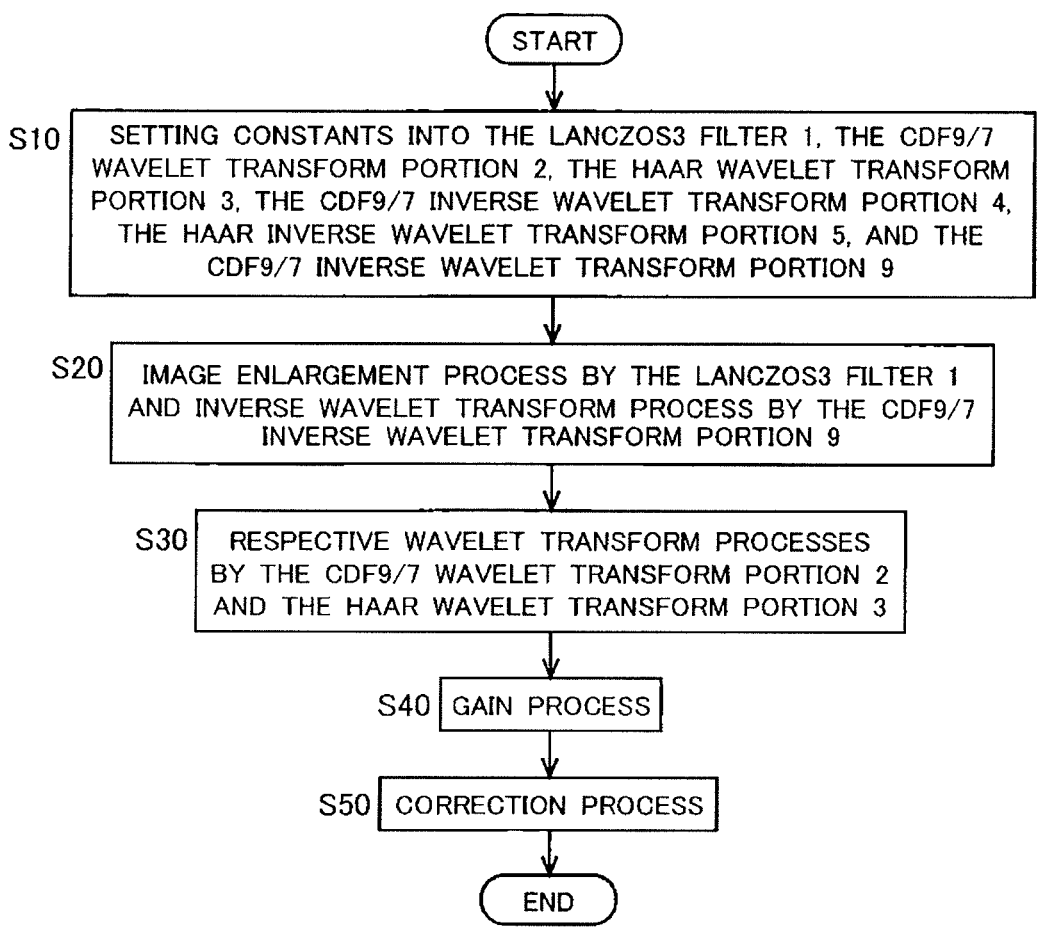
FIG. 2 is a flow chart showing operation of the image enlargement device according to the first embodiment of the present invention.

Back to FIG. 2, the operation of the image enlargement device according to the first embodiment of the present invention continues to be described. In a step S50 that follows the step S40, a correction process is performed. The adder 10 adds the correction signals REV_CDF9/7 and REV_Haar generated in the step S40 to the IMG_SYNTH generated in the step S20, thereby generating the output image IMG_OUT. The output image IMG_OUT becomes an output from the image enlargement device according to the first embodiment of the present invention.

Figure 5:
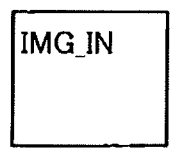
FIG. 5 is a view schematically showing an image size of each image in the first embodiment, the second embodiment, a fourth embodiment, and a fifth embodiment of the present invention.
Figure 5:
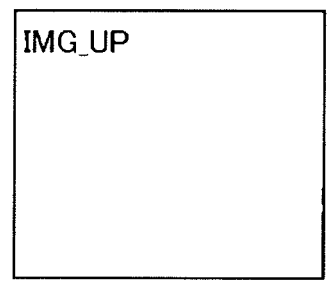
Figure 5:
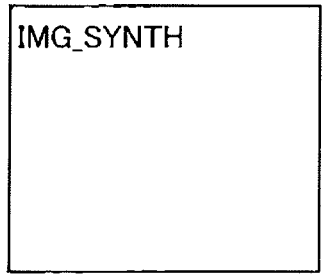
Figure 5:
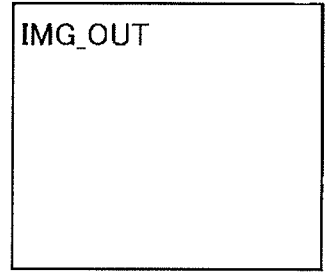
Figure 5:
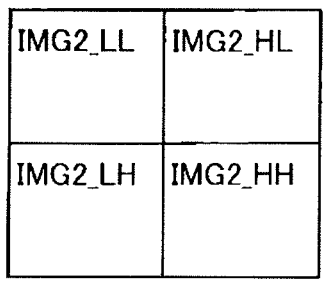
Figure 5:
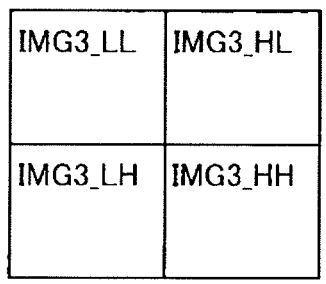

In the present embodiment, if the input image IMG_IN is M pixels×N pixels (M and N are each a natural number), the enlarged images IMG_UP and IMG_SYNTH each become 2M pixels×2N pixels; the sub-band components IMG2_LL, IMG2_HL, IMG2_LH, and IMG2_HH each become M pixels×N pixels; and the sub-band components IMG3_LL, IMG3_HL, IMG3_LH, and IMG3_HH each become M pixels×N pixels (see FIG. 5). In other words, the image enlargement device according to the first embodiment of the present invention performs the 2-fold image enlargement in both of the horizontal direction and the vertical direction.

Besides, in the present embodiment, the positive constants c1 and c2 used by the gain control portion 6 are stored in the non-volatile memory that is incorporated in the control portion. By rewriting the positive constants c1 and c2, it is possible to freely adjust the edge accentuation strength.

The image enlargement device according to the first embodiment of the present invention is able to accentuate the image contour portion and the image detail portion independent of each other with strengths different from each other, accordingly, it is possible to accentuate the image contour and the image detail at the same time with a good image quality.

<Image Enlargement Device According to Second Embodiment of the Present Invention>

Figure 4:
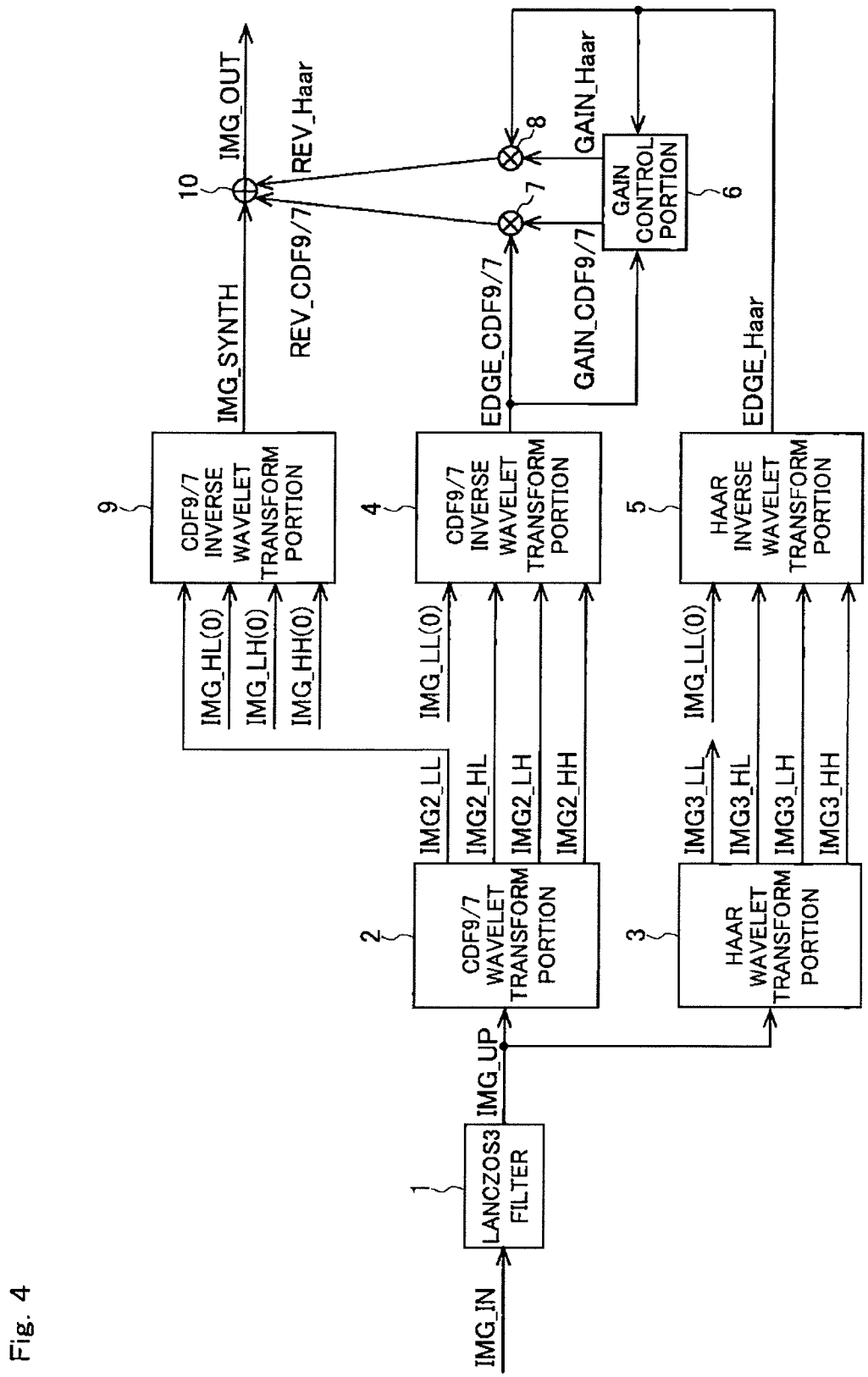
FIG. 4 is a view showing a structure of an image enlargement device according to a second embodiment of the present invention.

FIG. 4 shows a structure of an image enlargement device according to a second embodiment of the present invention. Here, in FIG. 4, the same portions as in FIG. 1 are indicated by the same reference numbers. The image enlargement device according to the second embodiment of the present invention, like the image enlargement device according to the first embodiment of the present invention, includes: the Lanczos3 filer 1; the CDF9/7 wavelet transform portion 2; the Haar wavelet transform portion 3; the CDF9/7 inverse wavelet transform portion 4; the Haar inverse wavelet transform portion 5; the gain control portion 6; the multipliers 7 and 8; the CDF9/7 inverse wavelet transform portion 9; the adder 10; and the control portion (not shown) that incorporates a rewritable non-volatile memory.

The image enlargement device according to the second embodiment of the present invention is different from the image enlargement device according to the first embodiment of the present invention in that the CDF9/7 inverse wavelet transform portion 9 does not regard the input image IMG_IN as the sub-band component IMG_LL of the wavelet transform image, nor regard the combination of the sub-band component IMG_LL with the remaining three sub-band components IMG_HL (0), IMG_LH (0), and IMG_HH (0) as the wavelet transform image, but regards the sub-band component IMG2_LL output from the CDF9/7 wavelet transform portion 2 as the sub-band component IMG_LL of the wavelet transform image, regards a combination of the sub-band component IMG2_LL with the remaining three sub-band components IMG_HL (0), IMG_LH (0), and IMG_HH (0) as the wavelet transform image, and performs the CDF9/7 inverse wavelet transform, thereby generating the enlarged image IMG_SYNTH.

The image enlargement device according to the second embodiment of the present invention, like the image enlargement device according to the first embodiment of the present invention, is able to accentuate the image contour portion and the image detail portion independent of each other with strengths different from each other, accordingly, it is possible to accentuate the image contour and the image detail at the same time with a good image quality.

<Image Enlargement Device According to Third Embodiment of the Present Invention>

Figure 6:
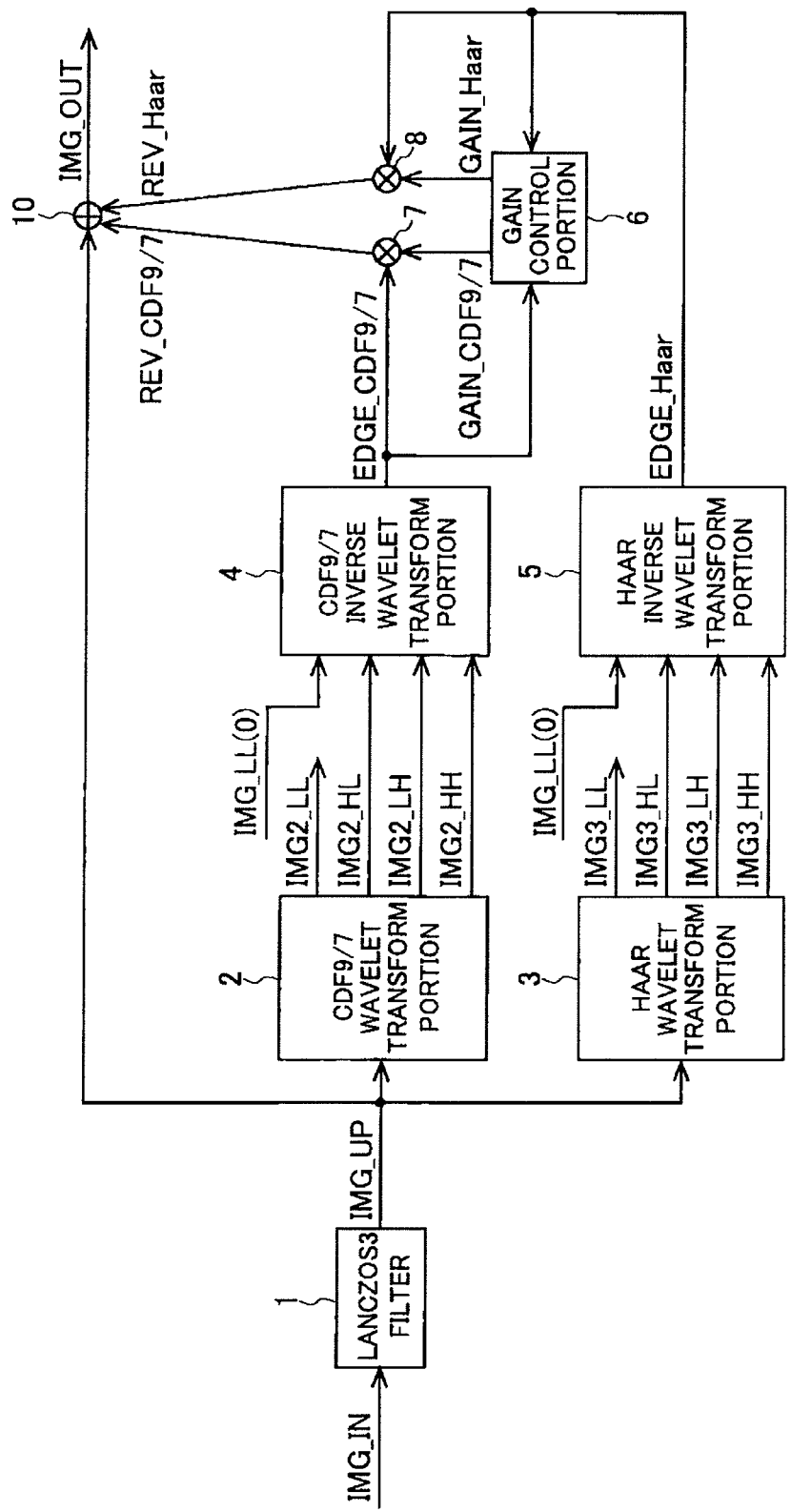
FIG. 6 is a view showing a structure of an image enlargement device according to a third embodiment of the present invention.

FIG. 6 shows a structure of an image enlargement device according to a third embodiment of the present invention. Here, in FIG. 6, the same portions as in FIG. 1 are indicated by the same reference numbers. The image enlargement device according to the third embodiment of the present invention has a structure in which the CDF9/7 inverse wavelet transform portion 9 is removed from the image enlargement device according to the first embodiment of the present invention; and the adder 10 adds the correction signals REV_CDF9/7 and REV_Haar output from the multipliers 7 and 8 to the enlarged image IMG_UP output from the Lanczos3 filter 1, thereby generating the output image IMG_OUT.

The image enlargement device according to the third embodiment of the present invention, like the image enlargement device according to the first embodiment of the present invention and the image enlargement device according to the second embodiment of the present, invention, is able to accentuate the image contour portion and the image detail portion independent of each other with strengths different from each other, accordingly, it is possible to accentuate the image contour and the image detail at the same time with a good image quality.

Besides, in the image enlargement device according to the third embodiment of the present invention, the enlargement by the Lanczos3 filter 1 is not limited to the 2-fold in any of the horizontal direction and the vertical direction.

Figure 7:
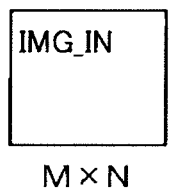
FIG. 7 is a view schematically showing an image size of each image in the third embodiment, and a sixth embodiment of the present invention.
Figure 7:
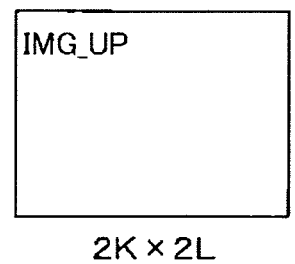
Figure 7:
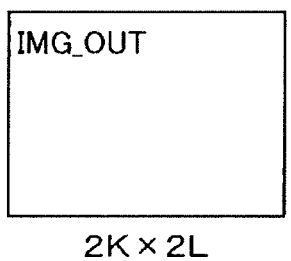
Figure 7:
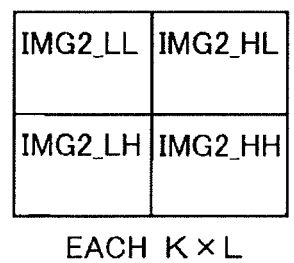
Figure 7:
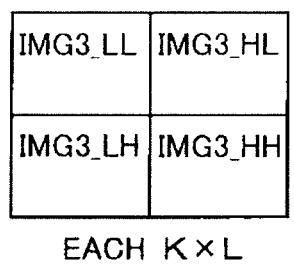

In the present embodiment, the input image IMG_IN is M pixels×N pixels (M and N are each a natural number); the enlarged image IMG_UP and the output image IMG_OUT are each 2K pixels×2 L pixels (K is a natural number larger than M/2, L is a natural number larger than N/2); the sub-band components IMG2_LL, IMG2_HL, IMG2_LH, and IMG2_HH are each K pixels×L pixels; and the sub-band components IMG3_LL, IMG3_HL, IMG3_LH, and IMG3_HH each become K pixels×L pixels (see FIG. 7). In other word, the image enlargement device according to the third embodiment of the present invention is able to perform the enlargement process if the number of pixels in the horizontal direction of the output image IMG_OUT and the number of pixels in the vertical direction of the output image IMG_OUT are each a multiple of 2.

In the first embodiment and the second embodiment, as described above, it is possible to perform only the 2-fold image enlargement in both of the horizontal direction and the vertical direction. However, a desired enlarged image does not always become two times the input image that is the original image in any of the horizontal direction and the vertical direction. Accordingly, in a case where the desired enlarged image does not become two times the input image that is the original image in any of the horizontal direction and the vertical direction, it is possible to obtain the desired enlarged image by disposing the conventional enlargement and reduction device in a previous stage or a subsequent stage of the image enlargement device according to the first embodiment of the present invention or of the image enlargement device according to the second embodiment of the present invention; however, the cost becomes all the higher because the conventional enlargement and reduction device is disposed.

The image sizes of typical display television signals and display panels are each a multiple of 2 in both of the horizontal direction and the vertical direction as shown in a table 1, accordingly, even if the conventional enlargement and reduction device is not disposed in the previous stage and the subsequent stage, the image enlargement device according to the third embodiment of the present invention is able to be compatible with the image sizes of the typical display television signals and display panels.

TABLE 1

| Name | Image Size |
| --- | --- |
| NTSC | 720 × 480 |
| PAL | 720 × 576 |
| XGA | 1024 × 768 |
| 720P | 1280 × 720 |
| WXGA | 1280 × 768 |
| HD | 1366 × 768 |
| Full HD | 1920 × 1080 |
| 4k2k | 2048 × 1024 |
| 8k4k | 4096 × 2048 |

<Problem with the Image Enlargement Devices According to the First to Third Embodiments of the Present Invention>

The image enlargement devices according to the first to third embodiments of the present invention are able to accentuate the image contour and the image detail at the same time with the good image quality; however, have a problem (hereinafter, called a "first problem") that when the image contour and the image detail are accentuated independent of each other, the contour remains in the detail; and have a problem (hereinafter, called a "second problem") that mesh-like noise appears on both of the contour and the detail.

<Image Enlargement Device According to Fourth Embodiment of the Present Invention>

An image enlargement device according to a fourth embodiment of the present invention is an image enlargement device that is able to accentuate the image contour portion and the image detail portion at the same time with a good image quality; further, also able to solve the above first problem and the above second problem.

Figure 8:
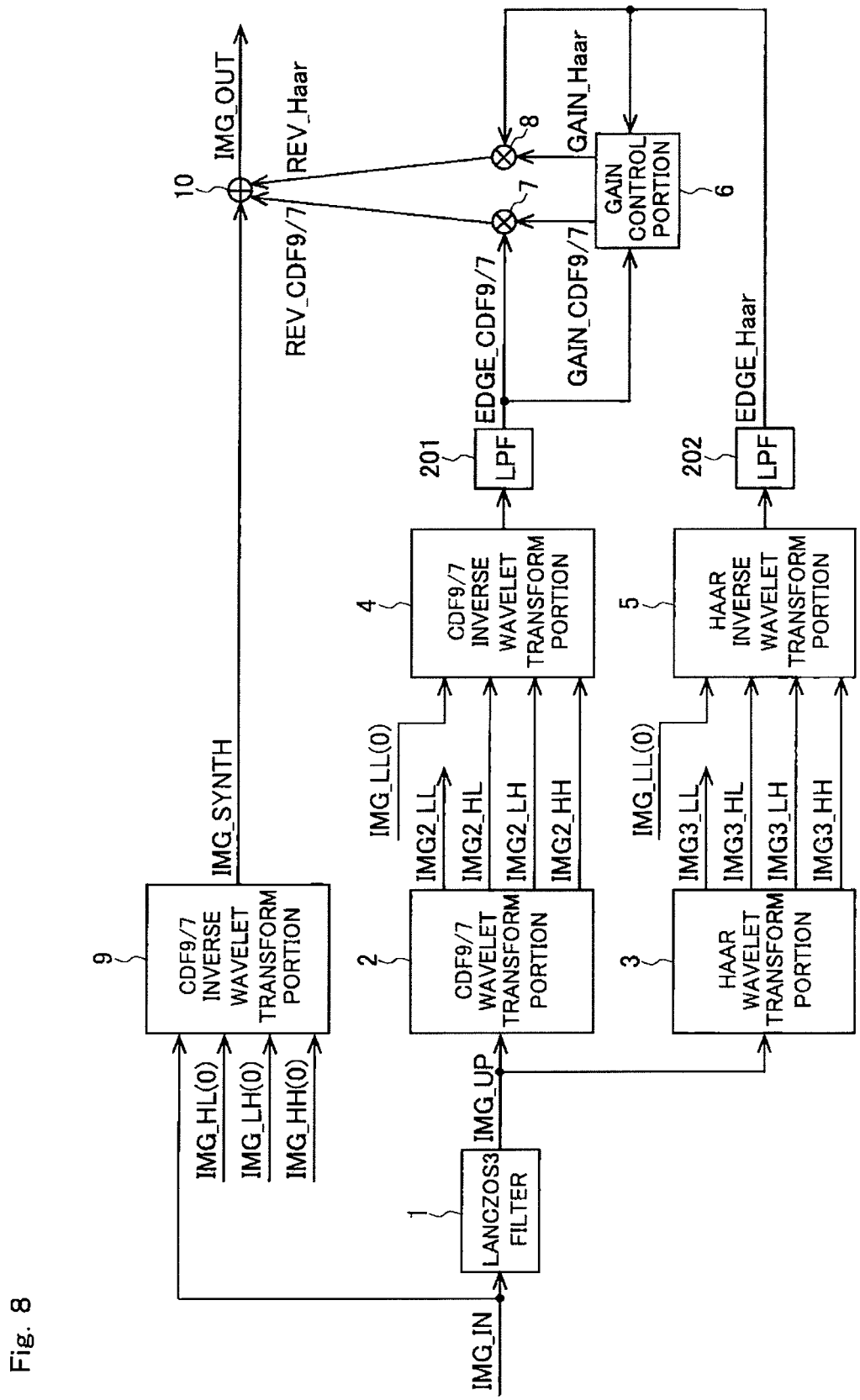
FIG. 8 is a view showing a structure of an image enlargement device according to the fourth embodiment of the present invention.

FIG. 8 shows a structure of the image enlargement device according to the fourth embodiment of the present invention. Here, in FIG. 8, the same portions as in FIG. 1 are indicated by the same reference numbers. The image enlargement device according to the fourth embodiment of the present invention includes: the Lanczos3 filer 1; the CDF9/7 wavelet transform portion 2; the Haar wavelet transform portion 3; the CDF9/7 inverse wavelet transform portion 4; the Haar inverse wavelet transform portion 5; the gain control portion 6; the multipliers 7 and 8; the CDF9/7 inverse wavelet transform portion 9; the adder 10; the control portion (not shown) that incorporates a rewritable non-volatile memory; and LPFs (Low Pass Filter) 201 and 202. As an example of the LPFs 201 and 202, for example, there is a LPF that extracts a low frequency component by using a Gaussian function according to the following formula (I).

$$g(x, y) \frac{1}{2\pi\sigma_x\sigma_y} e^{-\left(\frac{x^2}{2\sigma_x^2} + \frac{y^2}{2\sigma_y^2}\right)} \quad (1)$$

Operation of the image enlargement device according to the fourth embodiment of the present invention is described with reference to a flow chart shown in FIG. 9. Here, in FIG. 9, the same steps as in FIG. 2 are indicated by the same reference numbers.

First, the control portion reads, from the non-volatile memory, constant settings for the Lanczos3 filter 1, the CDF9/7 wavelet transform portion 2, the Haar wavelet transform portion 3, the CDF9/7 inverse wavelet transform portion 4, the Haar inverse wavelet transform portion 5, and the CDF9/7 inverse wavelet transform portion 9, and sets constants into the Lanczos3 filter 1, the CDF9/7 wavelet transform portion 2, the Haar wavelet transform portion 3, the CDF9/7 inverse wavelet transform portion 4, the Haar inverse wavelet transform portion 5, and the CDF9/7 inverse wavelet transform portion 9 (step S10). In the present embodiment, the constant for the Lanczos3 filter 1 is set such that the Lanczos3 filter 1 functions as an image enlargement filter that enlarges an image by two times in both of a horizontal direction and a vertical direction.

Next, the Lanczos3 filter 1 generates the enlarged image IMG_UP that is two times as large as the input image IMG_IN in both of the horizontal direction and the vertical direction (step S20). Besides, the CDF9/7 inverse wavelet transform portion 9 regards the input image IMG_IN as the sub-band component IMG_LL of an wavelet transform image, regards a combination of the sub-band component IMG_LL with the remaining three sub-band components IMG_HL (0), IMG_LH (0), and IMG_HH (0) as the wavelet transform image, and performs the CDF9/7 inverse wavelet transform, thereby generating the enlarged image IMG_SYNTH (step S20). Here, the sub-band components IMG_HL (0), IMG_LH (0), and IMG_HH (0) are sub-band components whose respective pixel values are all 0.

Next, the CDF9/7 wavelet transform portion 2 applies the CDF9/7 wavelet transform to the enlarged image IMG_UP to generate the sub-band components IMG2_LL, IMG2_HL, IMG2_LH, and IMG2_HH (step S30). Besides, the Haar wavelet transform portion 3 applies the Haar wavelet transform to the enlarged image IMG_UP to generate the sub-band components IMG3_LL, IMG3_HL, IMG3_LH, and IMG3_HH (step S30).

In the next step S45, a low pass filter process and a gain process are performed. Hereinafter, the low pass filter process and the gain process are described in detail.

The CDF9/7 inverse wavelet transform portion 4 regards a combination of the sub-band component IMG_LL (0) with the sub-band components IMG2_HL, IMG2_LH, and IMG2_HH output from the CDF9/7 wavelet transform portion 2 as the wavelet transform image, and performs the CDF9/7 inverse wavelet transform, thereby generating an edge signal. The LPF 201 applies the low pass filter process to the edge signal generated by the CDF9/7 inverse wavelet transform portion 4; thereafter, outputs the edge signal (the edge signal after the low pass filter process) EDGE_CDF9/7 to the multiplier 7 and the gain control portion 6. Besides, the Haar inverse wavelet transform portion 5 regards a combination of the sub-band component IMG_LL (0) with the sub-band components IMG3_HL, IMG3_LH, and IMG3_HH output from the Haar wavelet transform portion 3 as the wavelet transform image, and performs the Haar inverse wavelet transform, thereby generating an edge signal. The LPF 202 applies the low pass filter process to the edge signal generated by the Haar inverse wavelet transform portion 5; thereafter, outputs the edge signal (the edge signal after the low pass filter process) EDGE_Haar to the multiplier 8 and the gain control portion 6. Here, the sub-band component IMG_LL (0) is a sub-band component whose pixel values are all 0.

Figure 10:
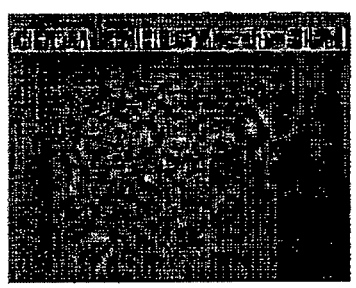
FIG. 10 is view showing edge signal examples before and after a low pass filter process.
Figure 10:

According to the above process, the low pass filter process is applied to the edge signal that is generated by the CDF9/7 inverse wavelet transform portion 4, accordingly, it is possible to alleviate the mesh-like noise appearing on the image contour portion, while the low pass filter process is applied to the edge signal that is generated by the Haaar inverse wavelet transform portion 5, accordingly, it is possible to alleviate the mesh-like noise appearing on the image detail portion. This is clear from comparison of the FIG. 10 (a) and FIG. 10 (b). FIG. 10 (a) shows an example of a signal that is output from the Haar inverse wavelet transform 5 and is visualized; and FIG. 10 (b) shows an example of the edge signal EDGE_Haar that is output from the LPF 202 and is visualized.

The gain control portion 6, based on respective values of the edge signals EDGE_CDF9/7 and EDGE_Haar of a pixel G (m, n) of interest at the m (natural number)-th row and the n (natural number)-th column, decides respective values of the gains GAIN_CDF9/7 and GAIN_Haar of the pixel G (m, n) of interest.

In the present embodiment, the gain control portion 6 determines whether the value of the edge signal EDGE_CDF9/7 of the pixel G (m, n) of interest is larger than the first threshold value Th1 or not, and if the value of the edge signal EDGE_CDF9/7 of the pixel G (m, n) of interest is larger than the first threshold value Th1, sets the value of the edge signal EDGE_CDF9/7 of the pixel G (m, n) of interest at the c1 (positive constant); if the value of the edge signal EDGE_CDF9/7 of the pixel G (m, n) of interest is equal to or smaller than the first threshold value Th1, sets the value of the gain GAIN_CDF9/7 of the pixel G (m, n) of interest at 0. And, the gain GAIN_CDF9/7 and the edge signal EDGE_CDF9/7 are multiplied together by the multiplier 7, whereby the correction signal REV_CDF9/7 is generated.

The edge signal EDGE_CDF9/7 obtained by using the CDF9/7 wavelet transform represents smoothly (naturally) the image contour, accordingly, thanks to the above process, the correction signal REV_CDF9/7 becomes a correction signal that accentuates the image contour portion. Here, the first threshold value Th1 is a coring threshold value.

Besides, in the present embodiment, the gain control portion 6 determines whether the value of the edge signal EDGE_CDF9/7 of the pixel G (m, n) of interest is smaller than the second threshold value Th2 or not and the value of the edge signal EDGE_Haar of the pixel G (m, n) of interest is larger than the third threshold value Th3 or not, and if the value of the edge signal EDGE_CDF9/7 of the pixel G (m, n) of interest is smaller than the second threshold value Th2 and the value of the edge signal EDGE_Haar of the pixel G (m, n) of interest is larger than the third threshold value Th3, sets the value of the gain GAIN_Haar of the pixel G (m, n) of interest at the c2 (positive constant); if the value of the edge signal EDGE_CDF9/7 of the pixel G (m, n) of interest is equal to or larger than the second threshold value Th2 and/or the value of the edge signal EDGE_Haar of the pixel G (m, n) of interest is equal to or smaller than the third threshold value Th3, sets the value of the gain GAIN_Haar of the pixel G (m, n) of interest at 0. However, irrespective of the setting of the value of the gain GAIN_Haar of the pixel G (m, n) of interest, if there is a pixel in a region (region that spreads from m−Δm (natural number) to m+Δm in row, and from n−Δn (natural number) to n+Δn in column) which is around the pixel G (m, n) of interest and in which the edge signal EDGE_CDF9/7 is larger than a fourth threshold value Th4, the value of the gain GAIN_Haar of the pixel G (m, n) of interest is forcibly set at 0. And, the gain GAIN_Haar and the edge signal EDGE_Haar are multiplied together by the multiplier 8, whereby the correction signal REV_Haar is generated. Here, the c2 may have the same value as the c1 or a value different from the c1.

The edge signal EDGE_Haar obtained by using the Haar wavelet transform contains both of the image contour and the image detail and Jaggy resides in the image contour contained in the edge signal EDGE_Haar, accordingly, the image contour portion (a pixel portion where the edge signal EDGE_VDF9/7 is large) is removed, and only the image detail portion is kept. Thanks to the above process, the correction signal REV_Haar becomes a correction signal that accentuates the image detail portion only. Here, the second threshold value Th2 is a threshold value for determining whether a pixel corresponds to the image contour portion or not, and the third threshold value Th3 is a coring threshold value.

Further, if there is a pixel in the region (region that spreads from m−Δm to m+Δm in row, and from n−Δn to n+Δn in column) which is around the pixel G (m, n) of interest and in which the edge signal EDGE_CDF9/7 is larger than the fourth threshold value Th4, the value of the gain GAIN_Haar of the pixel G (m, n) of interest is forcibly set at 0, accordingly, it is possible to alleviate the contour remaining in the detail when accentuating the image contour and the image detail independent of each other.

Figure 11:
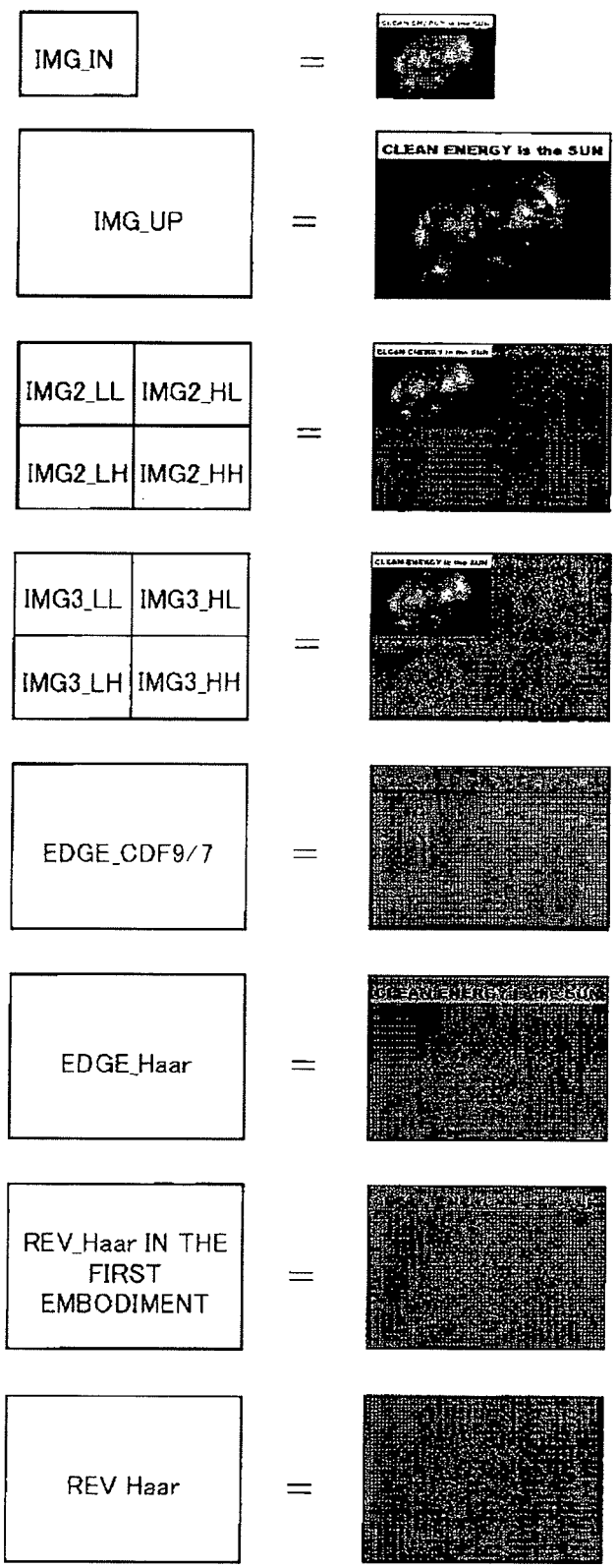
FIG. 11 is a view showing input and output data examples at each portion of the image enlargement device according to the fourth embodiment of the present invention.

Here, in a case where the first threshold value Th1 and the second threshold value Th2 are identical to each other, FIG. 11 shows input and output data examples at each portion of the image enlargement device according to the fourth embodiment of the present invention. In order from top, there visualized are: the input IMG_IN input into the Lanczos3 filter 1; the enlarged image IMG_UP output from the Lanczos3 filter 1; the sub-band components IMG2_LL, IMG2_HL, IMG2_LH, and IMG2_HH output from the CDF9/7 wavelet transform portion 2; the sub-band components IMG3_LL, IMG3_HL, IMG3_LH, and IMG3_HH output from the Haar wavelet transform portion 3; the edge signal EDGE_CDF9/7 output from the LPF 201; the edge signal EDGE_Haar output from the LPF 202; the correction signal REV_Haar (comparison example) output from the multiplier 8 of the image enlargement device according to the first embodiment of the present invention shown in FIG. 1; and the correction signal REV_Haar output from the multiplier 8.

From comparison of the correction signal REV_Haar (comparison example), which is output from the multiplier 8 of the image enlargement device according to the first embodiment of the present invention shown in FIG. 1 and visualized, and the correction signal REV_Haar output from the multiplier 8 of the present embodiment, it is understood that in the present embodiment, it is possible to alleviate the contour (a trace of words "CLEAN ENERGY is the SUN" in an example of FIG. 11) remaining in the detail (correction signal REV_Haar) when accentuating the image contour and the image detail independent of each other.

Figure 9:
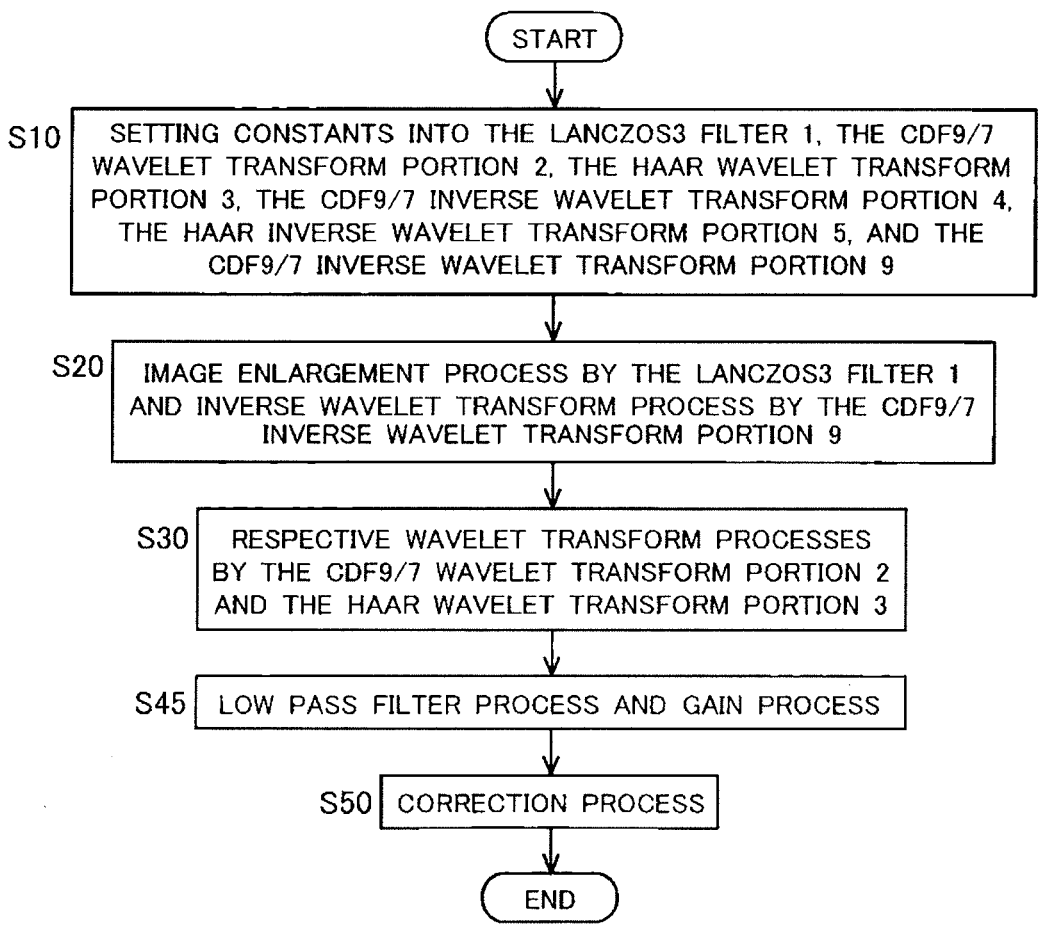
FIG. 9 is a flow chart showing operation of the image enlargement device according to the fourth embodiment of the present invention.

Back to FIG. 9, the operation of the image enlargement device according to the fourth embodiment of the present invention continues to be described. In the step S50 that follows the step S45, a correction process is performed. The adder 10 adds the correction signals REV_CDF9/7 and REV_Haar generated in the step S45 to the IMG_SYNTH generated in the step S20, thereby generating the output image IMG_OUT. The output image IMG_OUT becomes an output from the image enlargement device according to the fourth embodiment of the present invention.

In the present embodiment, if the input image IMG_IN is M pixels×N pixels (M and N are each a natural number), the enlarged image IMG_UP and IMG_SYNTH each become 2M pixels×2N pixels; the sub-band components IMG2_LL, IMG2_HL, IMG2_LH, and IMG2_HH each become M pixels×N pixels; and the sub-band components IMG3_LL, IMG3_HL, IMG3_LH, and IMG3_HH each become M pixels×N pixels (see FIG. 5). In other words, the image enlargement device according to the fourth embodiment of the present invention performs the 2-fold image enlargement in both of the horizontal direction and the vertical direction.

Besides, in the present embodiment, the positive constants c1 and c2 used by the gain control portion 6 are stored in the non-volatile memory that is incorporated in the control portion. By rewriting the positive constants c1 and c2, it is possible to freely adjust the edge accentuation strength.

The image enlargement device according to the fourth embodiment of the present invention is able to accentuate the image contour portion and the image detail portion independent of each other with strengths different from each other, accordingly, it is possible to accentuate the image contour and the image detail at the same time with a good image quality. Besides, in the image enlargement device according to the fourth embodiment of the present invention, the low pass filter process is applied to the edge signal that is generated by the CDF9/7 inverse wavelet transform portion 4, accordingly, it is possible to alleviate the mesh-like noise appearing on the image contour portion, while the low pass filter process is applied to the edge signal that is generated by the Haar inverse wavelet transform portion 5, accordingly, it is possible to alleviate the mesh-like noise appearing on the image detail portion. Besides, in the image enlargement device according to the fourth embodiment of the present invention, if there is a pixel in the region (region that spreads from m−Δm to m+Δm in row, and from n−Δn to n+Δn in column) which is around the pixel G (m, n) of interest and in which the edge signal EDGE_CDF9/7 is larger than the fourth threshold value Th4, the value of the gain GAIN_Haar of the pixel G (m, n) of interest is forcibly set at 0, accordingly, it is possible to alleviate the contour remaining in the detail when accentuating the image contour and the image detail independent of each other.

<Image Enlargement Device According to Fifth Embodiment of the Present Invention>

An image enlargement device according to a fifth embodiment of the present invention, like the image enlargement device according to the fourth embodiment of the present invention, is an image enlargement device that is able to accentuate the image contour portion and the image detail portion at the same time with a good image quality; further, also able to solve the above first problem and the above second problem.

Figure 12:
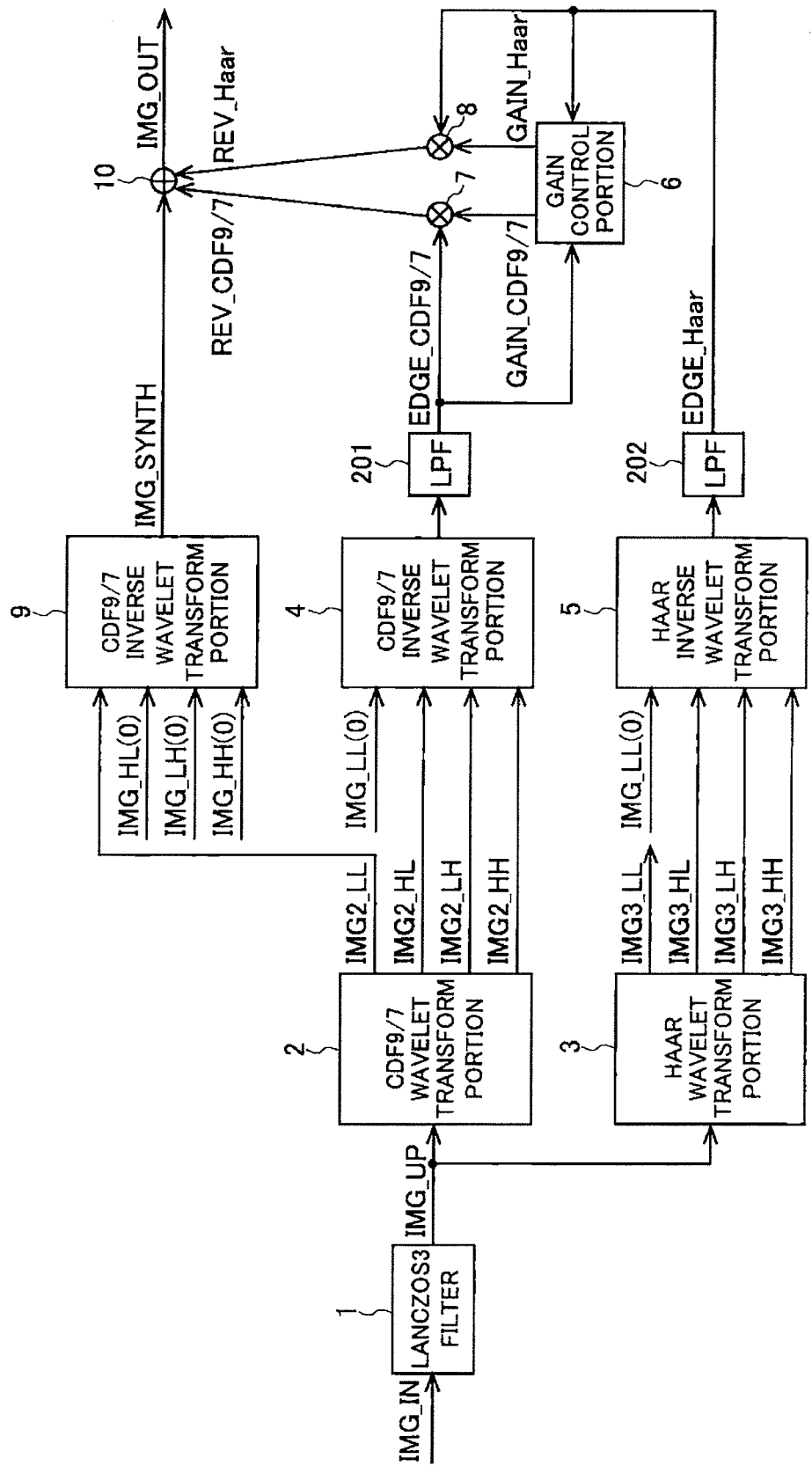
FIG. 12 is a view showing a structure of an image enlargement device according to the fifth embodiment of the present invention.

FIG. 12 shows a structure of the image enlargement device according to the fifth embodiment of the present invention. Here, in FIG. 12, the same portions as in FIG. 8 are indicated by the same reference numbers. The image enlargement device according to the fifth embodiment of the present invention, like the image enlargement device according to the fourth embodiment of the present invention, includes: the Lanczos3 filer 1; the CDF9/7 wavelet transform portion 2; the Haar wavelet transform portion 3; the CDF9/7 inverse wavelet transform portion 4; the Haar inverse wavelet transform portion 5; the gain control portion 6; the multipliers 7 and 8; the CDF9/7 inverse wavelet transform portion 9; the adder 10; the control portion (not shown) that incorporates a rewritable non-volatile memory; and the LPFs 201 and 202.

The image enlargement device according to the fifth embodiment of the present invention is different from the image enlargement device according to the fourth embodiment of the present invention in that the CDF9/7 inverse wavelet transform portion 9 does not regard the input image IMG_IN as the sub-band component IMG_LL of the wavelet transform image, nor regard the combination of the sub-band component IMG_LL with the remaining three sub-band components IMG_HL (0), IMG_LH (0), and IMG_HH (0) as the wavelet transform image, but regards the sub-band component IMG2_LL output from the CDF9/7 wavelet transform portion 2 as the sub-band component IMG_LL of the wavelet transform image, regards the combination of the sub-band component IMG2_LL with the remaining three sub-band components IMG_HL (0), IMG_LH (0), and IMG_HH (0) as the wavelet transform image, and performs the CDF9/7 inverse wavelet transform, thereby generating the enlarged image IMG_SYNTH.

The image enlargement device according to the fifth embodiment of the present invention, like the image enlargement device according to the fourth embodiment of the present invention, is able to accentuate the image contour portion and the image detail portion independent of each other with strengths different from each other, accordingly, it is possible to accentuate the image contour and the image detail at the same time with a good image quality. Besides, in the image enlargement device according to the fifth embodiment of the present invention, like in the image enlargement device according to the fourth embodiment of the present invention, the low pass filter process is applied to the edge signal that is generated by the CDF9/7 inverse wavelet transform portion 4, accordingly, it is possible to alleviate the mesh-like noise appearing on the image contour portion, while the low pass filter process is applied to the edge signal that is generated by the Haar inverse wavelet transform portion 5, accordingly, it is possible to alleviate the mesh-like noise appearing on the image detail portion. Besides, in the image enlargement device according to the fifth embodiment of the present invention, like in the image enlargement device according to the fourth embodiment of the present invention, if there is a pixel in the region (region that spreads from m−Δm to m+Δm in row, and from n−Δn to n+Δn in column) which is around the pixel G (m, n) of interest and in which the edge signal EDGE_CDF9/7 is larger than the fourth threshold value Th4, the value of the gain GAIN_Haar of the pixel G (m, n) of interest is forcibly set at 0, accordingly, it is possible to alleviate the contour remaining in the detail when accentuating the image contour and the image detail independent of each other.

<Image Enlargement Device According to Sixth Embodiment of the Present Invention>

An image enlargement device according to a sixth embodiment of the present invention, like the image enlargement devices according to the fourth embodiment of the present invention and the image enlargement device according to the fifth embodiment of the present invention, is an image enlargement device that is able to accentuate the image contour portion and the image detail portion at the same time with a good image quality; further, also able to solve the above first problem and the above second problem.

Figure 13:
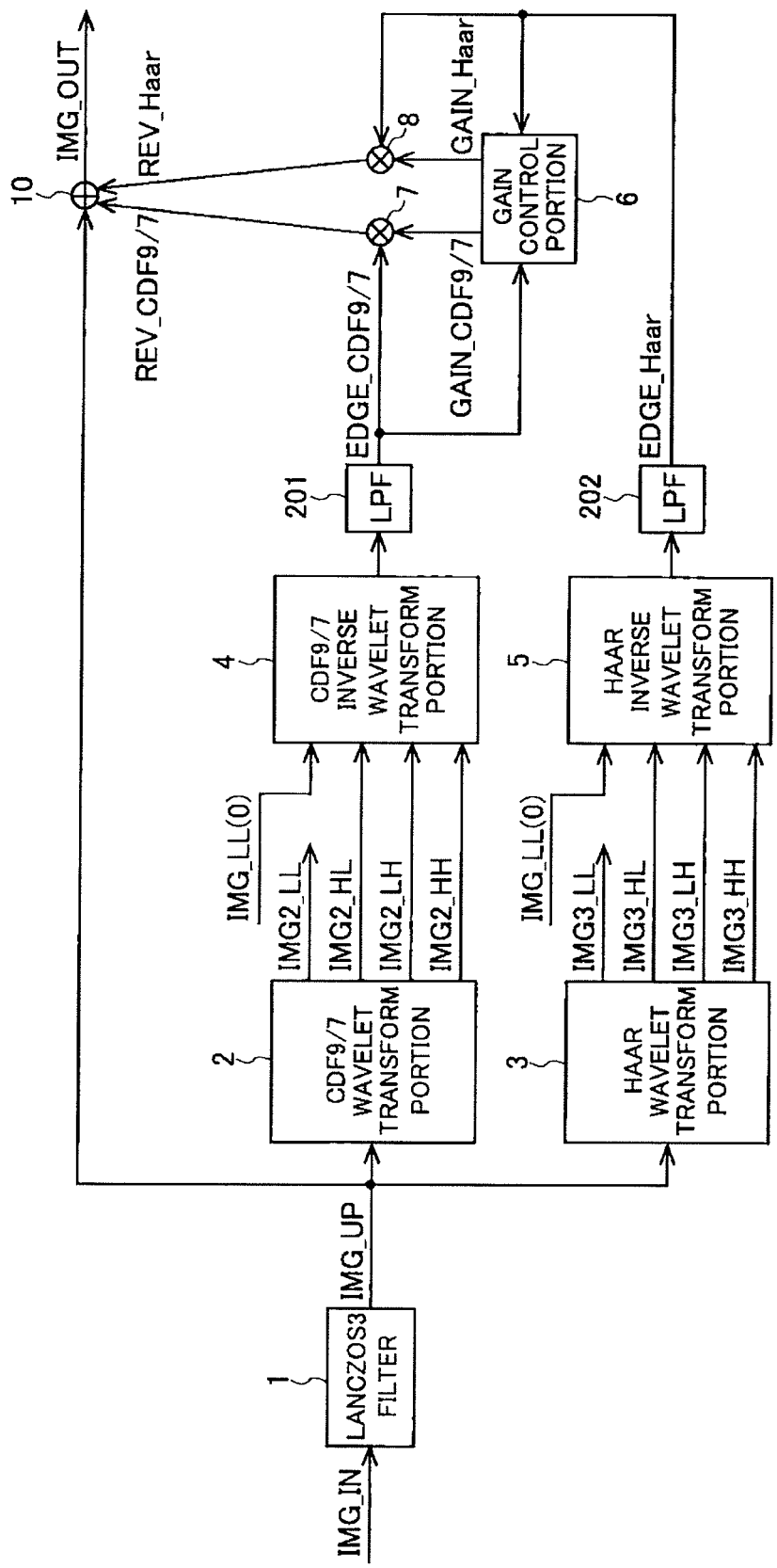
FIG. 13 is a view showing a structure of an image enlargement device according to the sixth embodiment of the present invention.

FIG. 13 shows a structure of the image enlargement device according to the sixth embodiment of the present invention. Here, in FIG. 13, the same portions as in FIG. 8 are indicated by the same reference numbers. The image enlargement device according to the sixth embodiment of the present invention has a structure in which the CDF9/7 inverse wavelet transform portion 9 is removed from the image enlargement device according to the fourth embodiment of the present invention; and the adder 10 adds the correction signals REV_CDF9/7 and REV_Haar output from the multipliers 7 and 8 to the enlarged image IMG_UP output from the Lanczos3 filter 1, thereby generating the output image IMG_OUT.

The image enlargement device according to the sixth embodiment of the present invention, like the image enlargement device according to the fourth embodiment of the present invention and the image enlargement device according to the fifth embodiment of the present invention, is able to accentuate the image contour portion and the image detail portion independent of each other with strengths different from each other, accordingly, it is possible to accentuate the image contour and the image detail at the same time with a good image quality. Besides, in the image enlargement device according to the sixth embodiment of the present invention, like in the image enlargement device according to the fourth embodiment of the present invention and the image enlargement device according to the fifth embodiment of the present invention, the low pass filter process is applied to the edge signal that is generated by the CDF9/7 inverse wavelet transform portion 4, accordingly, it is possible to alleviate the mesh-like noise appearing on the image contour portion, while the low pass filter process is applied to the edge signal that is generated by the Haar inverse wavelet transform portion 5, accordingly, it is possible to alleviate the mesh-like noise appearing on the image detail portion. Besides, in the image enlargement device according to the sixth embodiment of the present invention, like in the image enlargement device according to the fourth embodiment of the present invention and the image enlargement device according to the fifth embodiment of the present invention, if there is a pixel in the region (region that spreads from m−Δm to m+Δm in row, and from n−Δn to n+Δn in column) which is around the pixel G (m, n) of interest and in which the edge signal EDGE_CDF9/7 is larger than the fourth threshold value Th4, the value of the gain GAIN_Haar of the pixel G (m, n) of interest is forcibly set at 0, accordingly, it is possible to alleviate the contour remaining in the detail when accentuating the image contour and the image detail independent of each other.

Besides, in the image enlargement device according to the sixth embodiment of the present invention, the enlargement by the Lanczos3 filter 1 is not limited to the 2-fold in any of the horizontal direction and the vertical direction.

In the present embodiment, the input image IMG_IN is M pixels×N pixels (M and N are each a natural number); the enlarged image IMG_UP and the output image IMG_OUT are each 2K pixels×2 L pixels (K is a natural number larger than M/2, L is a natural number larger than N/2); the sub-band components IMG2_LL, IMG2_HL, IMG2_LH, and IMG2_HH are each K pixels×L pixels; and the sub-band components IMG3_LL, IMG3_HL, IMG3_LH, and IMG3_HH each become K pixels×L pixels (see FIG. 7). In other word, the image enlargement device according to the sixth embodiment of the present invention is able to perform the enlargement process if the number of pixels in the horizontal direction of the output image IMG_OUT and the number of pixels in the vertical direction of the output image IMG_OUT are each a multiple of 2.

In the fourth embodiment and the fifth embodiment, as described above, it is possible to perform only the 2-fold image enlargement in both of the horizontal direction and the vertical direction. However, a desired enlarged image does not always become two times the input image that is the original image in any of the horizontal direction and the vertical direction. Accordingly, in a case where the desired enlarged image does not become two times the input image that is the original image in any of the horizontal direction and the vertical direction, it is possible to obtain the desired enlarged image by disposing the conventional enlargement and reduction device in a previous stage or a subsequent stage of the image enlargement device according to the fourth embodiment of the present invention or of the image enlargement device according to the fifth embodiment of the present invention; however, the cost becomes all the higher because the conventional enlargement and reduction device is disposed.

The image sizes of typical display television signals and display panels are each a multiple of 2 in both of the horizontal direction and the vertical direction as shown in the table 1, accordingly, even if the conventional enlargement and reduction device is not disposed in the previous stage and the subsequent stage, the image enlargement device according to the sixth embodiment of the present invention is able to be compatible with the image sizes of the typical display television signals and display panels.

<Display Device According to the Present Invention>

Figure 14:
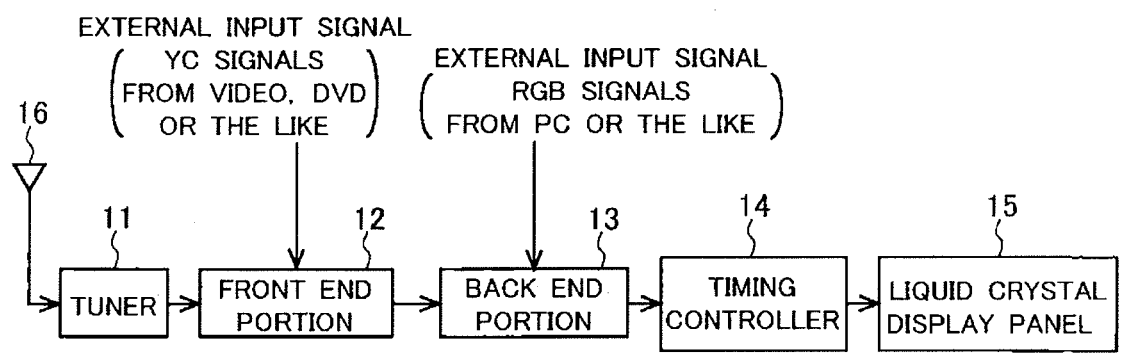
FIG. 14 is a view showing a schematic structure of a liquid crystal television that is an example of a display device according to the present invention.

FIG. 14 shows a schematic structure of a liquid crystal television that is an example of a display device according to the present invention. The liquid crystal television shown in FIG. 14 includes: a tuner 11; a front end portion 12; a back end portion 13; a timing controller 14; and a liquid crystal display panel 15.

The tuner 11 converts a broadcast wave signal of a reception channel contained in a high frequency signal that is transmitted from an antenna 16 into a specific frequency signal and outputs the specific frequency signal to the front end portion 12.

The front end portion 12 processes the output signal from the tuner 11 or an external input signal (YC signals from video, DVD or the like). In a case where the signal to be processed is a composite signal, the front end portion 12 performs a YC separation process. Besides, in a case where the signal to be processed is a compressed signal, the front end portion 12 performs a decode process. Besides, in a case where the signal to be processed is a signal of interlace type, the front end portion 12 performs an IP conversion process to convert the signal of interlace type into a signal of progressive type.

The back end portion 13 has a RGB conversion process portion (not shown in FIG. 14) that converts YC signals into RBG signals. Besides, the back end portion 13 has a scaler edge accentuation process portion (not shown in FIG. 14) that performs a scaler process and an edge accentuation process. The back end portion 13 processes an output signal from the front end portion 12 or an external input signal (RGB signals from a personal computer or the like) and output RGB signals, to which the scaler process and the edge accentuation process are applied, to the timing controller 14.

The timing controller 14 applies, to an output signal from the back end portion 13, frame rate transform (e.g., double-speed process), gamma correction, and a correction process for strengthening a drive signal before a predicted change in an video signal, and drives the liquid crystal display panel 15 by means of a drive signal that is obtained by these processes.

In the liquid crystal television that is an example of the display device according to the present invention and shown in FIG. 14, the image enlargement device according to the present invention is disposed in the scaler•edge accentuation process portion of the back end portion 13.

Figure 15A:
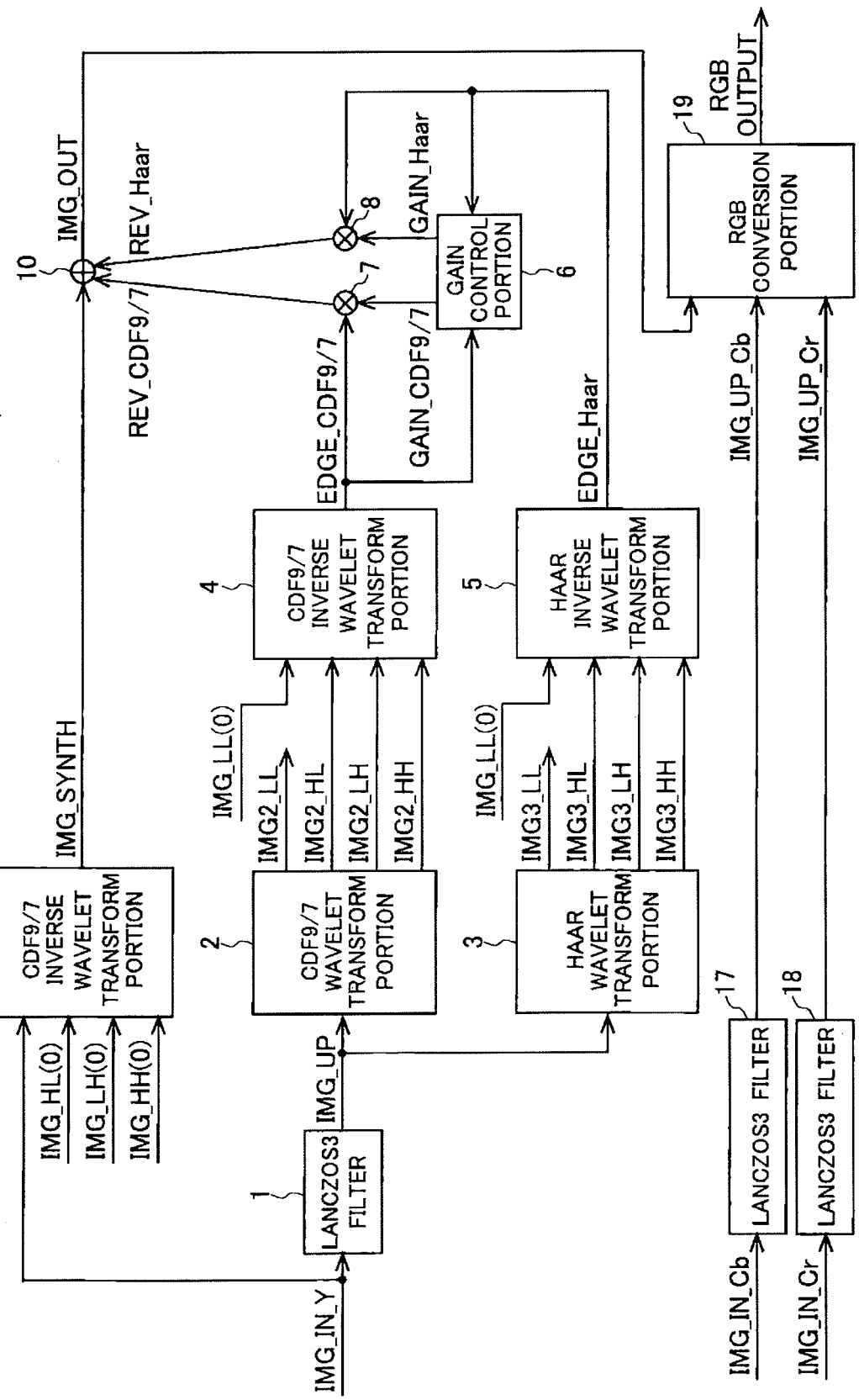
FIG. 15A is a view showing a structural example of a back end portion that uses the image enlargement device according to the first embodiment of the present invention.

Here, FIG. 15A shows a structural example of the back end portion 13 in a case where the image enlargement device according to the first embodiment of the present invention is disposed. Here, In FIG. 15A, the same portions as in FIG. 1 are indicated by the same reference numbers.

In the back end portion 13 shown in FIG. 15A, in a subsequent stage of the scaler•edge accentuation process portion that is composed of the image enlargement device according to the first embodiment of the present invention and the Lanczos3 filters 17 and 18, a RGB conversion process portion 19 for converting YC signals into RGB signals is disposed. Here, the back end portion 13 shown in FIG. 15A includes a YC conversion process portion as well (not shown) that converts RGB signals into YC signals, and in a case of processing an external input signal (RGB signals from a personal computer or the like), first, converts the external input signal into YC signals by means of the YC conversion process portion.

In the back end portion 13 shown in FIG. 15A, the image enlargement device according to the first embodiment of the present invention processes a brightness image IMG_IN_Y as the input image. A color difference image IMG_IN_Cb undergoes the scaler process performed by the Lanczos3 filter 17, is converted into an enlarged color difference image IMG_UP_Cb that is enlarged by two times in both of the horizontal direction and the vertical direction, and supplied to the RGB conversion process portion 19. A color difference image IMG_IN_Cr undergoes the scaler process performed by the Lanczos3 filter 18, is converted into an enlarged color difference image IMG_UP_Cr that is enlarged by two times in both of the horizontal direction and the vertical direction, and supplied to the RGB conversion process portion 19.

Figure 15B:
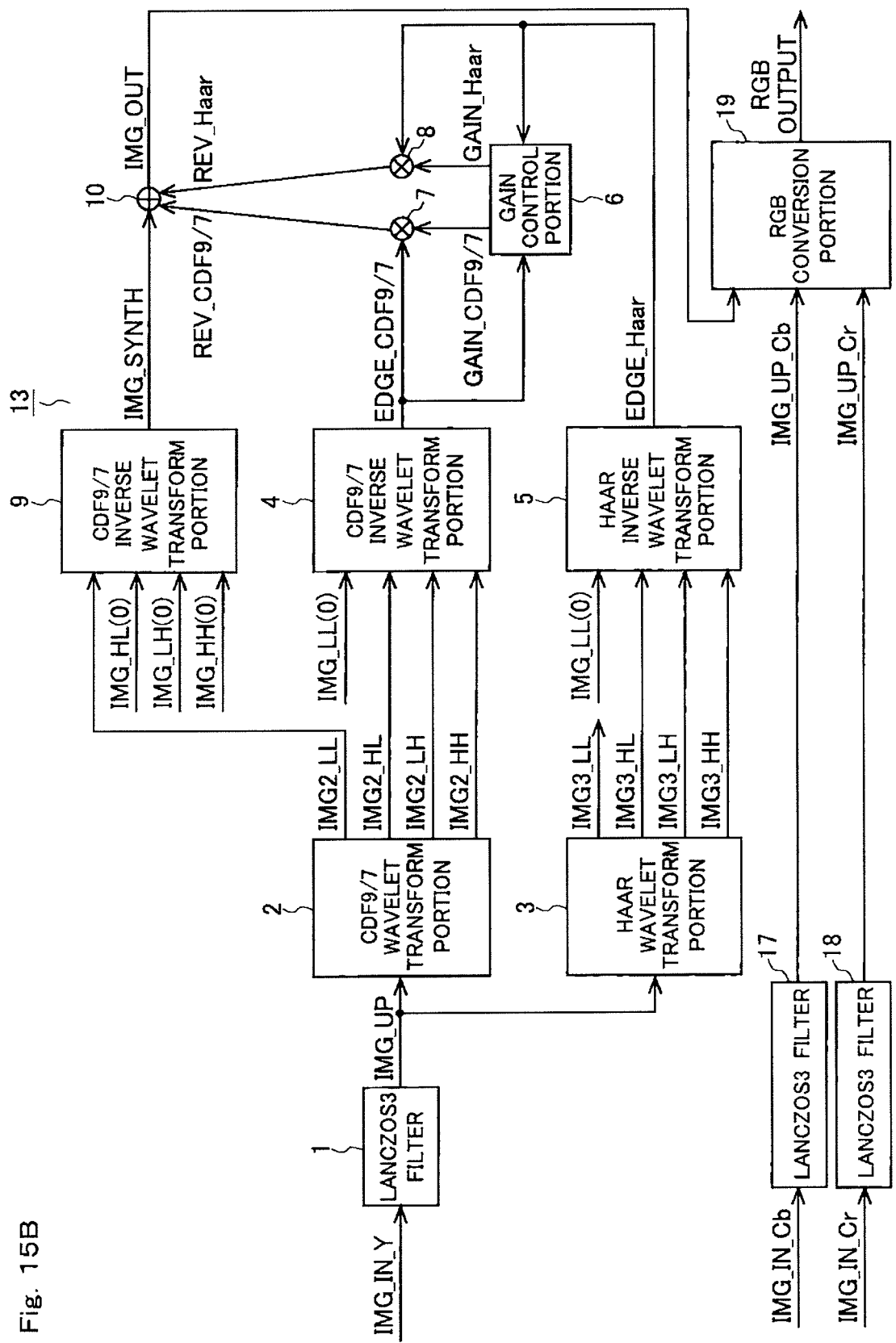
FIG. 15B is a view showing a structural example of a back end portion that uses the image enlargement device according to the second embodiment of the present invention.
Figure 15C:
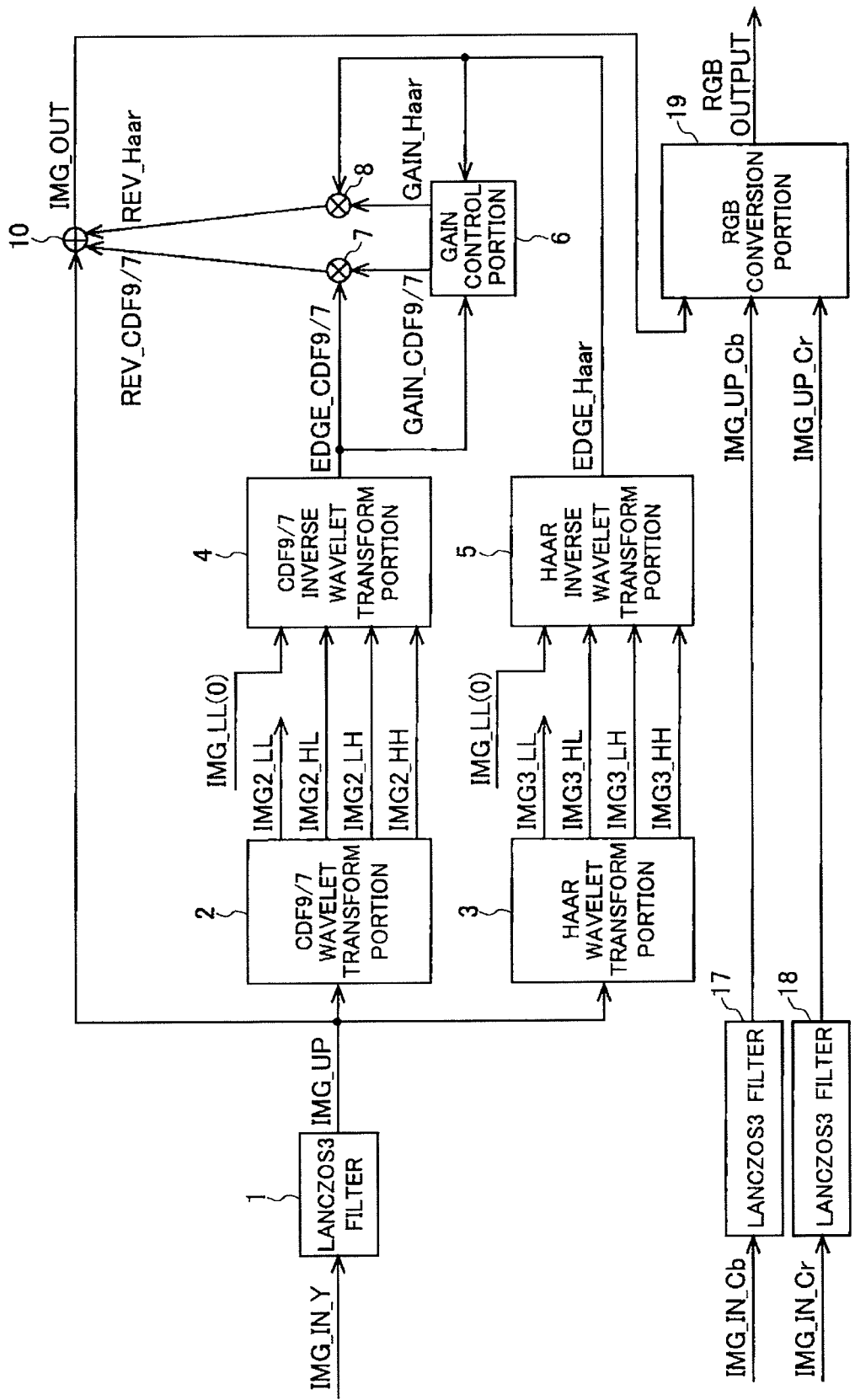
FIG. 15C is a view showing a structural example of a back end portion that uses the image enlargement device according to the third embodiment of the present invention.
Figure 15D:
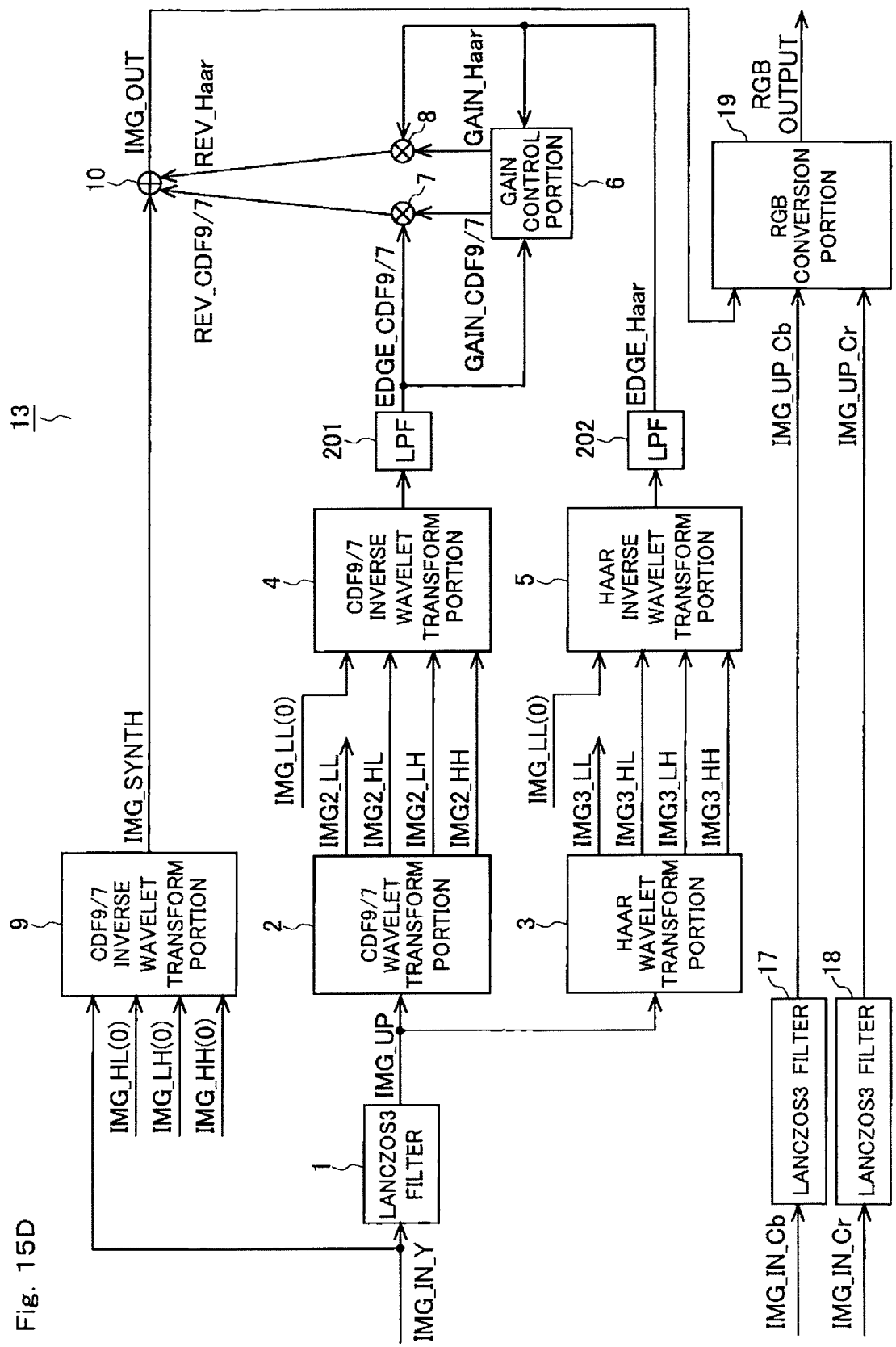
FIG. 15D is a view showing a structural example of a back end portion that uses the image enlargement device according to the fourth embodiment of the present invention.
Figure 15E:
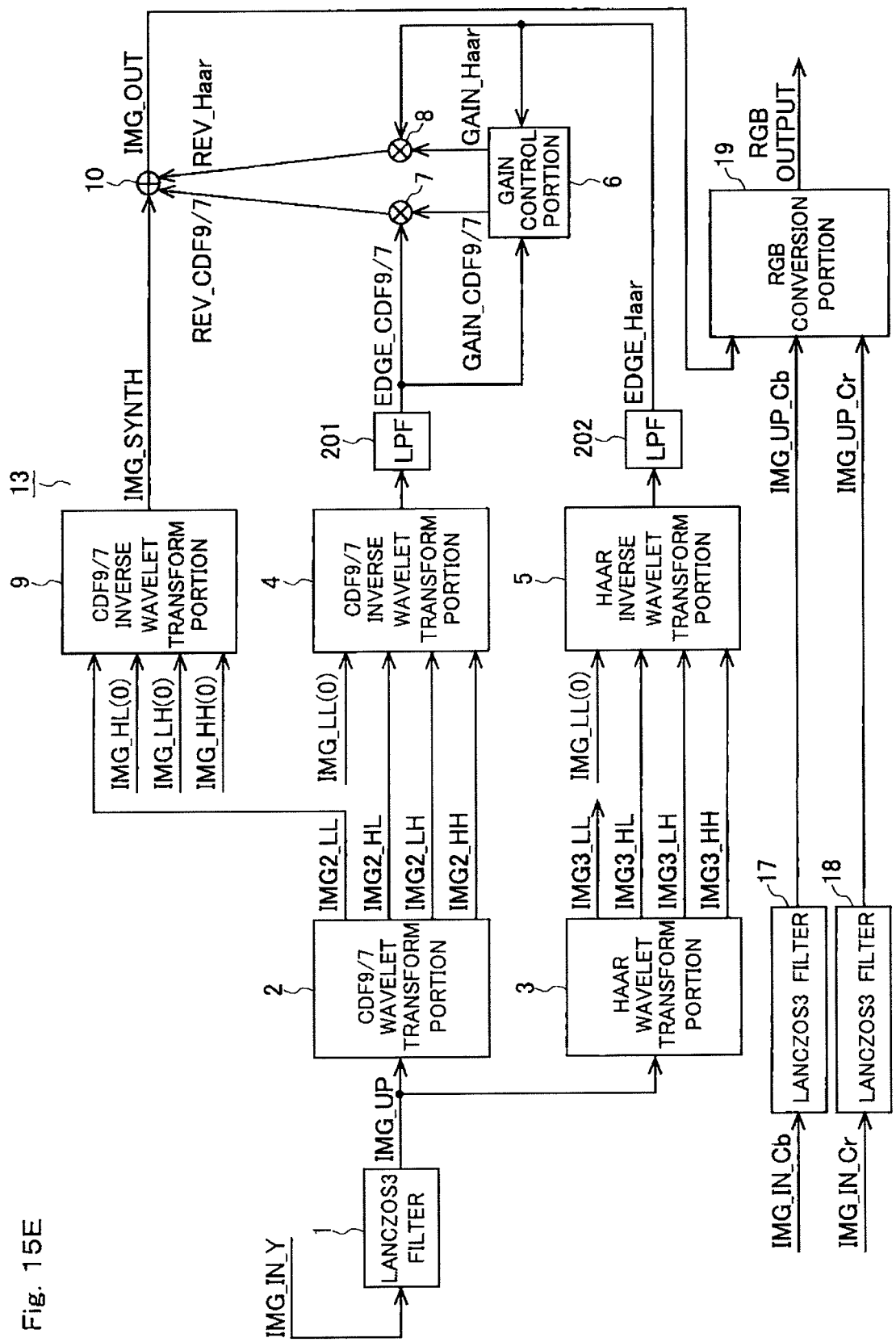
FIG. 15E is a view showing a structural example of a back end portion that use the image enlargement device according to the fifth embodiment of the present invention.
Figure 15F:
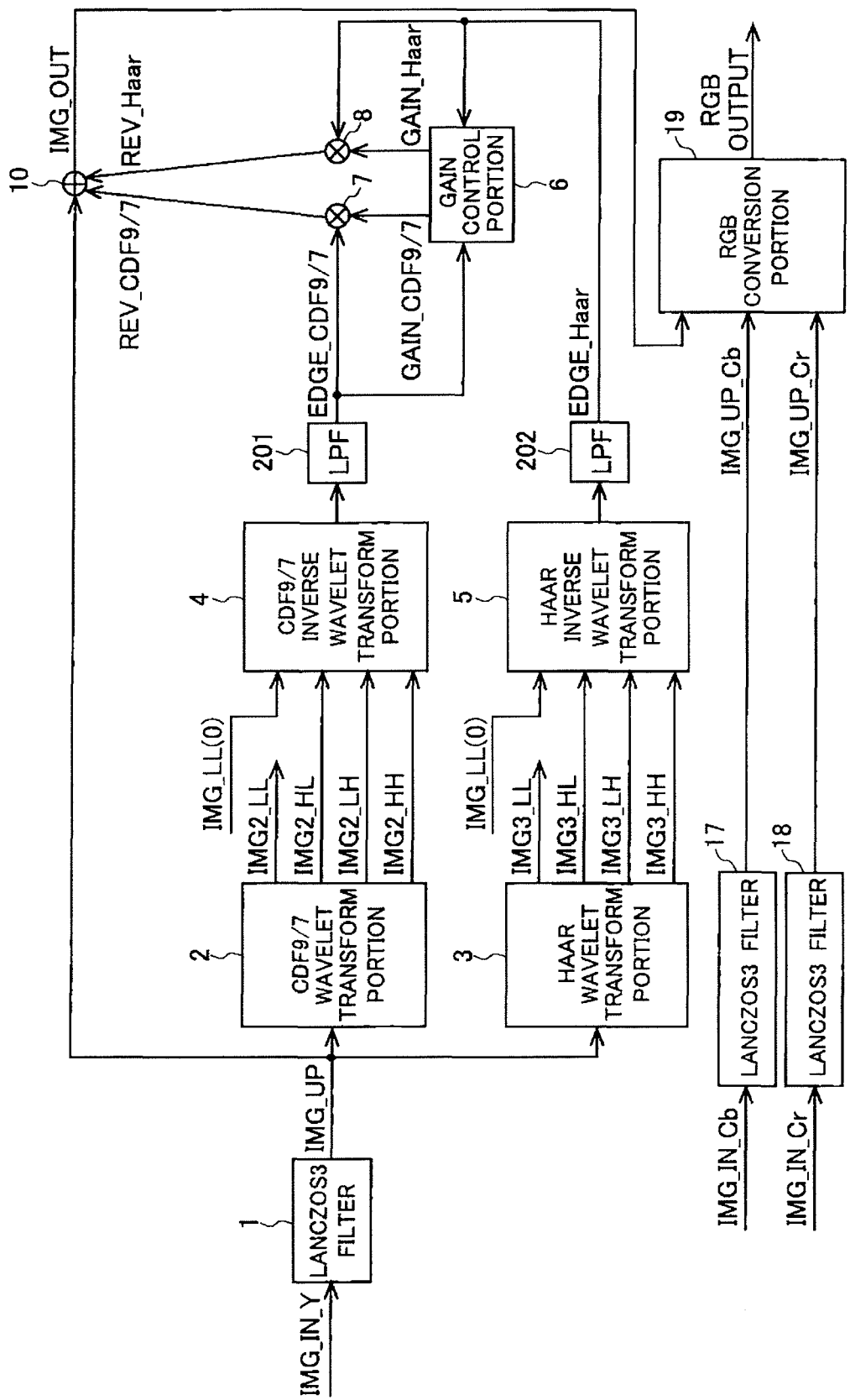
FIG. 15F is a view showing a structural example of a back end portion that uses the image enlargement device according to the sixth embodiment of the present invention.

Here, it goes without saying that instead of the image enlargement device according to the first embodiment of the present invention, the image enlargement device according to the present invention (e.g., the image enlargement device according to the second embodiment of the present invention, the image enlargement device according to the third embodiment of the present invention, the image enlargement device according to the fourth embodiment of the present invention, the image enlargement device according to the fifth embodiment of the present invention, or the image enlargement device according to the sixth embodiment of the present invention) other than the image enlargement device according to the first embodiment of the present invention may be disposed. A structural example of the back end portion 13 is as shown in FIG. 15B in a case where the image enlargement device according to the second embodiment of the present invention is disposed; a structural example of the back end portion 13 is as shown in FIG. 15C in a case where the image enlargement device according to the third embodiment of the present invention is disposed; a structural example of the back end portion 13 is as shown in FIG. 15D in a case where the image enlargement device according to the fourth embodiment of the present invention is disposed; a structural example of the back end portion 13 is as shown in FIG. 15E in a case where the image enlargement device according to the fifth embodiment of the present invention is disposed; and a structural example of the back end portion 13 is as shown in FIG. 15F in a case where the image enlargement device according to the sixth embodiment of the present invention is disposed.

Figure 15G:
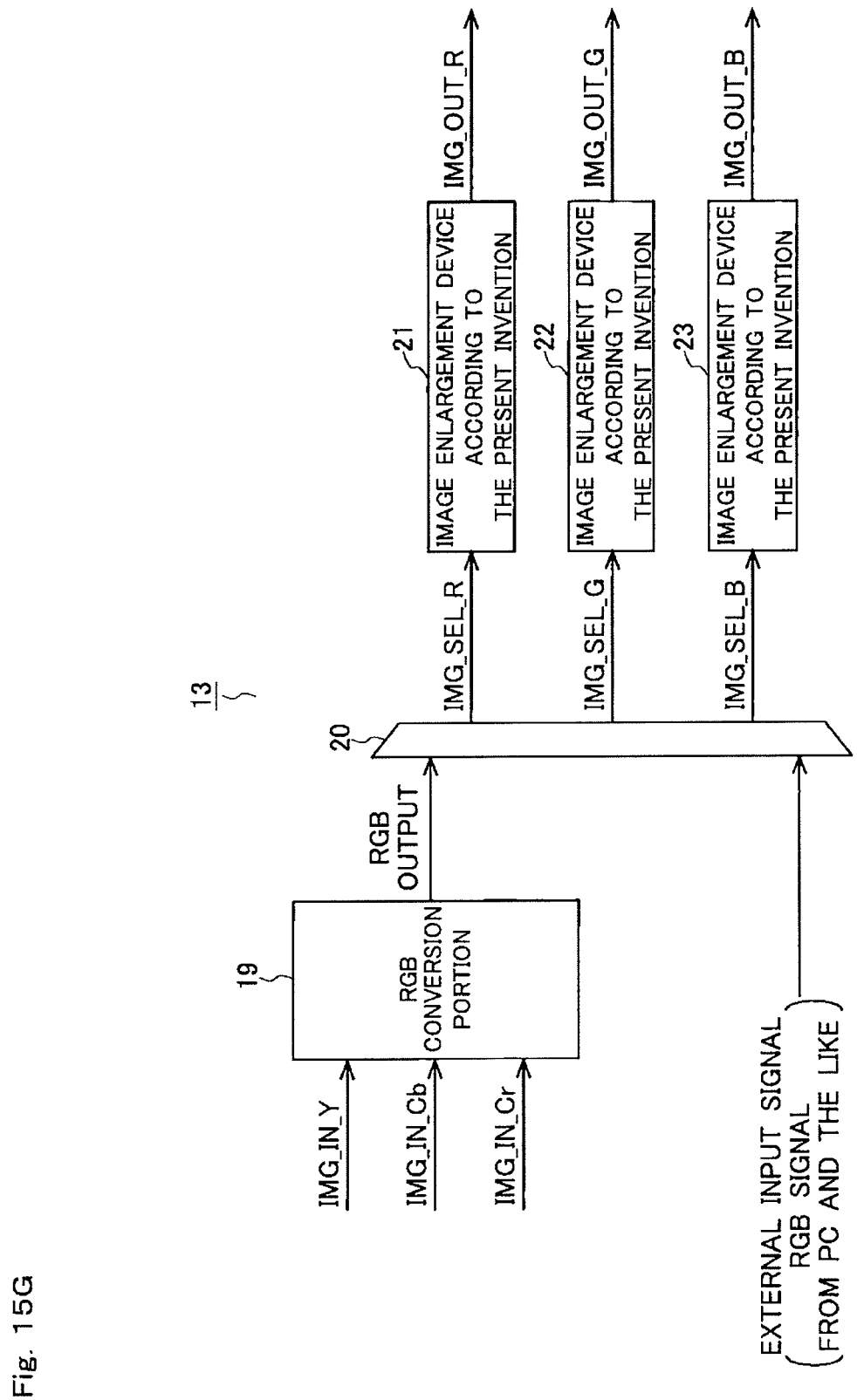
FIG. 15G is a view showing a structural example of a back end portion that uses the image enlargement devices according to the present invention, that is, a structural example of a back end portion in which the image enlargement devices are of type that processes R, G, B signals.

Besides, unlike the structures shown in FIG. 15A to FIG. 15F, it is possible to employ a structure in which in the back end portion 13, the scaler edge accentuation process portion is disposed in a subsequent stage of the RGB conversion process portion as shown in FIG. 15G. In the back end portion 13 shown in FIG. 15G, a selector 20 and the image enlargement devices 21 to 23 according to the present invention are disposed in a subsequent stage of the RGB conversion process portion 19 that converts YC signals into RGB signals. In the back end portion 13 shown in FIG. 15G, the image enlargement device according to the present invention is necessary for each of R, G, and B, accordingly, the three image enlargement devices according to the present invention are necessary. The RGB conversion process portion 19 converts the output signal (the brightness image IMG_IN_Y, the color difference image IMG_IN_Cb and the color difference image IMG_IN_Cr) from the front end portion 12 (see FIG. 14) into RGB signals and supplies the RGB signals to the selector 20. The selector 20 selects either of the RGB output from the RGB conversion process portion 19 and the external input signal (the RGB signals from a personal computer or the like). A red color component image IMG_SEL_R contained in the signal selected by the selector 20 undergoes the scaler process and the edge accentuation process performed by the image enlargement device 21 according to the present invention to become an enlarged red color component, image IMG_OUT_R. A green color component image IMG_SEL_G contained in the signal selected by the selector 20 undergoes the scaler process and the edge accentuation process performed by the image enlargement device 22 according to the present invention to become an enlarged green color component image IMG_OUT_G. A blue color component image IMG_SEL_B contained in the signal selected by the selector 20 undergoes the scaler process and the edge accentuation process performed by the image enlargement device 22 according to the present invention to become an enlarged blue color component image IMG_OUT_B. In other words, the image enlargement device 21 according to the present invention processes the red color component image IMG_SEL_R as the input image; the image enlargement device 22 according to the present invention processes the green color component image IMG_SEL_G as the input image; and the image enlargement device 23 according to the present invention processes the blue color component image IMG_SEL_B as the input image. As the image enlargement devices 21 to 23 according to the present invention, it is possible to use the image enlargement device according to the first embodiment of the present invention; however, it goes without saying that the image enlargement device according to the present invention (e.g., the image enlargement device according to the second embodiment of the present invention, the image enlargement device according to the third embodiment of the present invention, the image enlargement device according to the fourth embodiment of the present invention, the image enlargement device according to the fifth embodiment of the present invention, or the image enlargement device according to the sixth embodiment of the present invention) other than the image enlargement device according to the first embodiment of the present invention may be disposed.

Modifications

Hereinbefore, the embodiments of the present invention are described. However, the scope of the present invention is not limited to these embodiments, and it is possible to add various modifications without departing the spirit of the present invention and put them into practical use.

In the above embodiments, the Lanczos3 filter is used as the image enlargement filter; however, the Lanczos3 filter may be replaced with another filter (e.g., a filter that uses a bi-cubic method, a filter that uses a windowed sinc function, a filter that uses a Haaming window or a Kaiser window and the like) which has the image enlargement function.

The above fourth embodiment, fifth embodiment and sixth embodiment have the structure that is able to solve the first problem and the second problem; however, a structure may be employed which is able to solve only the first problem of the first problem and the second problem; or a structure may be employed which is able to solve only the second problem of the first problem and the second problem. As an example of the structure that is able to solve only the first problem of the first problem and the second problem, there is a structure that performs the setting of the value of the gain GAIN_Haar in the above first embodiment, second embodiment and third embodiment like in the above fourth embodiment, fifth embodiment and sixth embodiment. Besides, as an example of the structure that is able to solve only the second problem of the first problem and the second problem, there is a structure that performs the setting of the value of the gain GAIN_Haar in the above fourth embodiment, fifth embodiment and sixth embodiment like in the above first embodiment, second embodiment and third embodiment.

Figure 16:
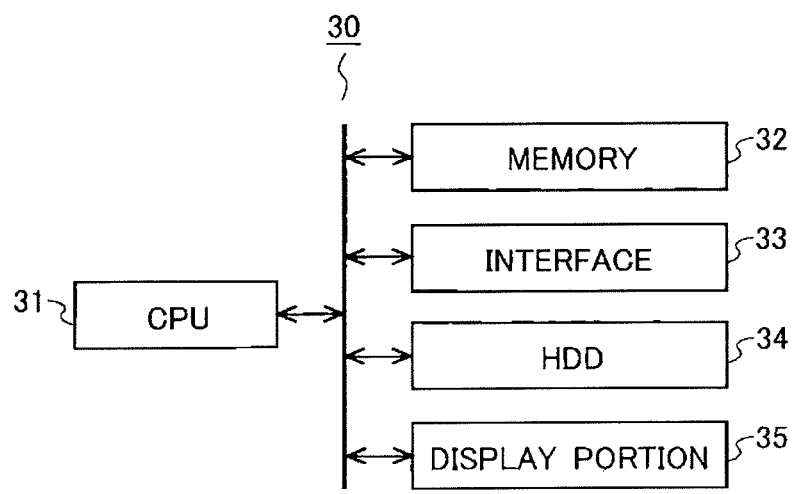
FIG. 16 is a view showing a schematic structure of a computer.
Figure 17:
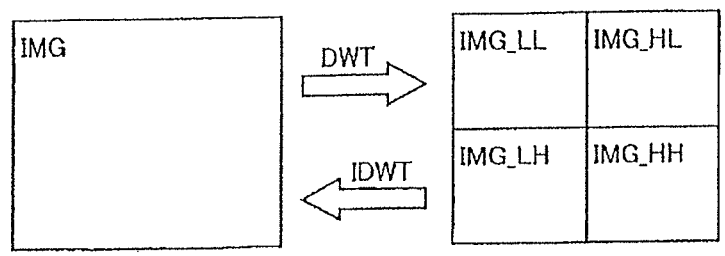
FIG. 17 is a view schematically showing an original image and a wavelet transform image.
Figure 18:
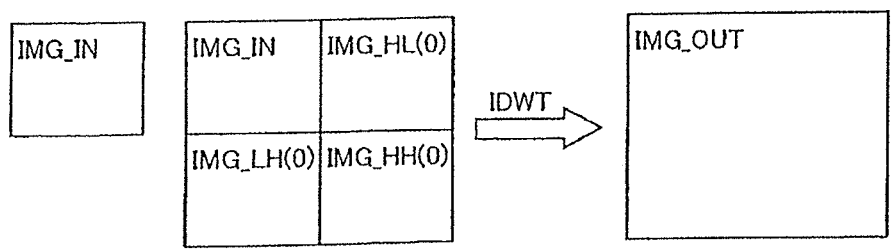
FIG. 18 is a view schematically showing an overview of an image enlargement method that uses wavelet transform.
Figure 19:
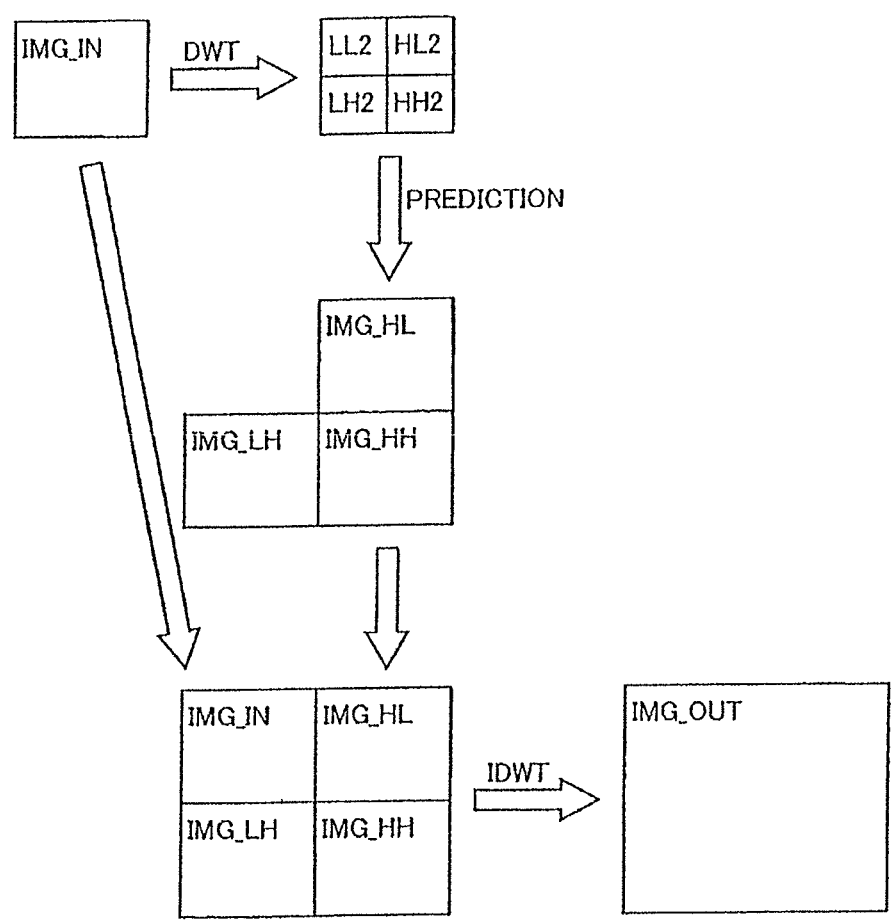
FIG. 19 is a view schematically showing an overview of an image enlargement method that is proposed by a patent literature 1.
Figure 21:
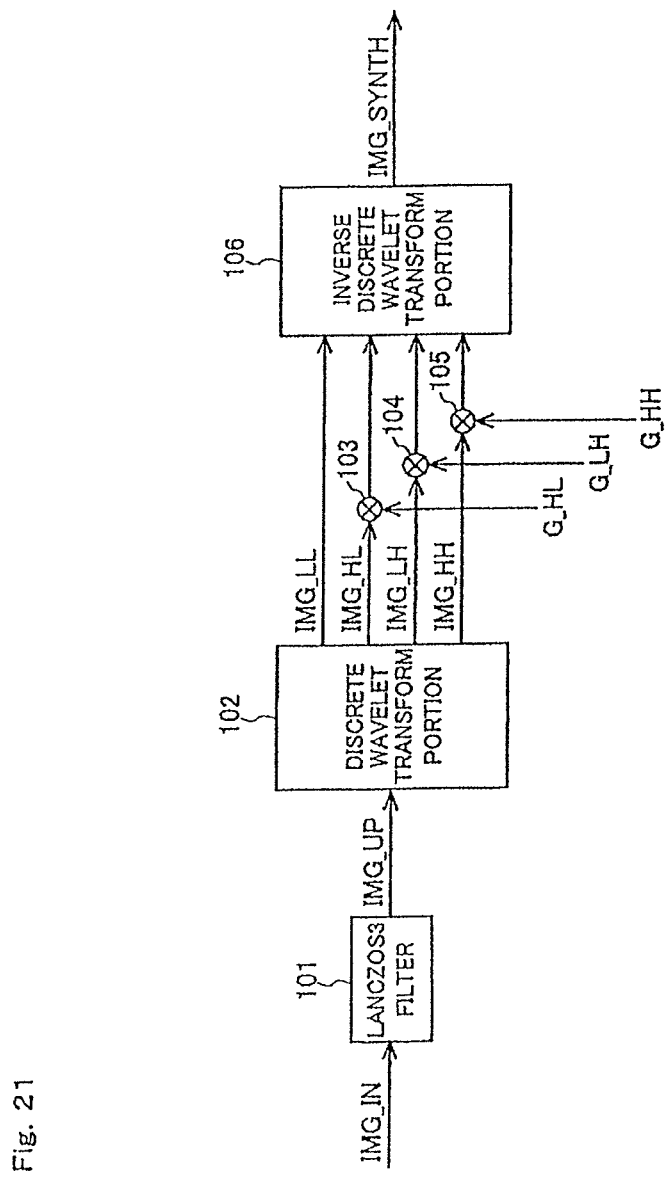
FIG. 21 is a view showing an example of an image enlargement device that is proposed in Japanese patent application No. 2009-225995.

Besides, the image enlargement device according to the present invention is not limited to a dedicated hardware device, and for example, as shown in FIG. 16, may be a system that is achieved by a CPU 31 of a personal computer and the like executing an image enlargement program that is stored in a memory 32. The CPU 31 is able to output an enlarged image, which is by enlarging an image obtained from outside via an interface 33 or stored in HDD 34, to outside via the interface 33, save them into the HDD 34, and display them on a display portion 35. Here, the image enlargement program according to the present invention is also storable in a computer-readable memory medium.

The image enlargement device, the mage enlargement program, the memory medium that stores the image enlargement program, and the display device according to the present invention are used when displaying low resolution contents on a high resolution display device, for example.

The invention claimed is:

1. An image enlargement device comprising:
an image enlargement filter that generates a first enlarged image of an input image;
a first wavelet transform portion that generates, by applying wavelet transform to the first enlarged image, a first sub-band component indicating an image obtained by extracting a low frequency component in a horizontal direction of the first enlarged image and a low frequency component in a vertical direction of the first enlarged image; a second sub-band component indicating an image obtained by extracting a high frequency component in a horizontal direction of the first enlarged image; a third sub-band component indicating an image obtained by extracting a high frequency component in a vertical direction of the first enlarged image; and a fourth sub-band component indicating an image obtained by extracting a high frequency component in a horizontal direction of the first enlarged image and a high frequency component in a vertical direction of the first enlarged image;
a second wavelet transform portion that generates, by applying the wavelet transform to the first enlarged image, a fifth sub-band component indicating an image obtained by extracting a low frequency component in a horizontal direction of the first enlarged image and a low frequency component in a vertical direction of the first enlarged image; a sixth sub-band component indicating an image obtained by extracting a high frequency component in a horizontal direction of the first enlarged image; a seventh sub-band component indicating an image obtained by extracting a high frequency component in a vertical direction of the first enlarged image; and an eighth sub-band component indicating an image obtained by extracting a high frequency component in a horizontal direction of the first enlarged image and a high frequency component in a vertical direction of the first enlarged image;
a first inverse wavelet transform portion that regards a predetermined sub-band component and the second sub-band component, the third sub-band component, and the fourth sub-band component, which are output from the first wavelet transform portion, as a wavelet transform image; performs inverse wavelet transform, thereby generating a first edge signal;
a second inverse wavelet transform portion that regards the predetermined sub-band component and the sixth sub-band component, the seventh sub-band component, and the eighth sub-band component, which are output from the second wavelet transform portion, as the wavelet transform image; performs the inverse wavelet transform, thereby generating a second edge signal;
an image enlargement portion that generates a second enlarged image; and
an accentuation process portion that applies an accentuation process to the second enlarged image by using the first edge signal and the second edge signal; wherein
the first wavelet transform portion and the second wavelet transform portion use wavelet transforms different from each other; and
the first inverse wavelet transform portion and the second inverse wavelet transform portion use inverse wavelet transforms different from each other.

2. The image enlargement device according to claim 1, wherein
the first wavelet transform portion uses CDF9/7 wavelet transform;
the second wavelet transform portion uses Haar wavelet transform;
the first inverse wavelet transform portion uses CDF9/7 inverse wavelet transform; and
the second inverse wavelet transform portion uses Haar inverse wavelet transform.

3. The image enlargement device according to claim 1, wherein
the image enlargement portion is a third inverse wavelet transform portion that regards the input image and three predetermined sub-band components as the wavelet transform image; performs the inverse wavelet transform, thereby generating the second enlarged image.

4. The image enlargement device according to claim 1, wherein
the image enlargement portion is a third inverse wavelet transform portion that regards the first sub-band component and three predetermined sub-band components as the wavelet transform image; performs the inverse wavelet transform, thereby generating the second enlarged image.

5. The image enlargement device according to claim 1, wherein
the image enlargement filter doubles as the image enlargement portion, and the first enlarged image and the second enlarged image are identical to each other.

6. The image enlargement device according to claim 1, wherein
the first edge signal is a signal that represents an image contour;
the second edge signal is a signal that contains both of the image contour and an image detail;
if there is a pixel, in a region around a pixel of interest, in which the first edge signal is larger than a predetermined threshold value, the accentuation process portion sets a gain, which corresponds to the second edge signal of the pixel of interest, at zero.

7. The image enlargement device according to claim 1, wherein
a first low pass filter for applying a low pass filter process to the first edge signal is disposed between the first inverse wavelet transform portion and the accentuation process portion; and
a second low pass filter for applying the low pass filter process to the second edge signal is disposed between the second inverse wavelet transform portion and the accentuation process portion.

8. A display device that comprises the image enlargement device according to claim 1.

9. The display device according to claim 8, wherein
the input image for the image enlargement device is a brightness image.

10. The display device according to claim 8, comprising the image enlargement devices to the number of three;
the input image for a first one of the three image enlargement devices is a red color component image;
the input image for a second one of the three image enlargement devices is a green color component image; and
the input image for a third one of the three image enlargement devices is a blue color component image.

* * * * *